US008923395B2

(12) United States Patent
Wang et al.

(10) Patent No.: US 8,923,395 B2
(45) Date of Patent: Dec. 30, 2014

(54) VIDEO CODING USING INTRA-PREDICTION

(75) Inventors: Xianglin Wang, San Diego, CA (US); Marta Karczewicz, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 13/247,812

(22) Filed: Sep. 28, 2011

(65) Prior Publication Data

US 2012/0082222 A1   Apr. 5, 2012

Related U.S. Application Data

(60) Provisional application No. 61/389,175, filed on Oct. 1, 2010, provisional application No. 61/500,014, filed on Jun. 22, 2011.

(51) Int. Cl.
| | |
|---|---|
| *H04N 7/12* | (2006.01) |
| *H04N 19/11* | (2014.01) |
| *H04N 19/70* | (2014.01) |
| *H04N 19/61* | (2014.01) |
| *H04N 19/593* | (2014.01) |
| *H04N 19/157* | (2014.01) |
| *H04N 19/463* | (2014.01) |
| *H04N 19/176* | (2014.01) |

(52) U.S. Cl.
CPC ... *H04N 19/00551* (2013.01); *H04N 19/00042* (2013.01); *H04N 19/00884* (2013.01); *H04N 19/00781* (2013.01); *H04N 19/00763* (2013.01); *H04N 19/00212* (2013.01); *H04N 19/00278* (2013.01)
USPC ............ 375/240.12; 375/240.01; 375/240.11; 375/240.13; 375/240.14; 375/240.15

(58) Field of Classification Search
CPC ............. H04N 7/32; H04N 7/15; H04N 7/50; H04N 7/26388; H04N 7/26638; H04N 7/26244; H04N 7/26271; H04N 7/26015; H04N 7/26031
USPC ..................................... 375/240.12
See application file for complete search history.

(56) References Cited

U.S. PATENT DOCUMENTS

2005/0147165 A1* 7/2005 Yoo et al. ................. 375/240.14
2006/0008006 A1* 1/2006 Cha et al. ................. 375/240.12

(Continued)

FOREIGN PATENT DOCUMENTS

| EP | 2285121 A1 | 2/2011 |
|---|---|---|
| JP | 201016454 A | 1/2010 |
| JP | 2010022058 A | 1/2010 |

OTHER PUBLICATIONS

Sullivan et al, Joint Model Reference Encoding Methods and Decoding Concealment, 2004.*

(Continued)

*Primary Examiner* — Andy Rao
*Assistant Examiner* — Shan Elahi
(74) *Attorney, Agent, or Firm* — Shumaker & Sieffert, P.A.

(57) ABSTRACT

In general, techniques of this disclosure are related to determining a prediction characteristic associated with a coding unit of video data, wherein determining the prediction characteristic includes determining a prediction type that defines a number of prediction units associated with the coding unit. Techniques of this disclosure may also be related to generating a set of available intra-prediction modes for the coding unit based on the prediction characteristic, selecting an intra-prediction mode from the available intra-prediction modes, and applying one of the available intra-prediction modes to code the coding unit.

32 Claims, 12 Drawing Sheets

(56) References Cited

U.S. PATENT DOCUMENTS

| | | | |
|---|---|---|---|
| 2006/0018385 A1* | 1/2006 | Lee | 375/240.24 |
| 2006/0233254 A1* | 10/2006 | Lee et al. | 375/240.16 |
| 2007/0053443 A1* | 3/2007 | Song | 375/240.24 |
| 2007/0083578 A1 | 4/2007 | Chen et al. | |
| 2007/0297511 A1* | 12/2007 | Chiu et al. | 375/240.16 |
| 2009/0028245 A1* | 1/2009 | Vieron et al. | 375/240.16 |
| 2009/0225871 A1 | 9/2009 | Omori | |
| 2009/0310677 A1 | 12/2009 | Shiodera et al. | |
| 2010/0086034 A1 | 4/2010 | Park et al. | |
| 2011/0038414 A1* | 2/2011 | Song et al. | 375/240.12 |
| 2011/0103485 A1 | 5/2011 | Sato et al. | |
| 2011/0176741 A1* | 7/2011 | Sato et al. | 382/238 |
| 2011/0243249 A1* | 10/2011 | Lee et al. | 375/240.25 |

OTHER PUBLICATIONS

Davies et al., "Suggestion for a Test Model," Document JCTVC-A033, 1st meeting: Dresden, DE, Apr. 15-23, 2010, 30 pp.

Bross et al., "WD4: Working Draft 4 of High-Efficiency Video Coding," 6th Meeting: JCTVC-F803_d2, Torino, IT, Jul. 14-22, 2011, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

International Preliminary Report on Patentability from International Application No. PCT/US2011/054040, dated Feb. 7, 2013, 7 pp.

Second Written Opinion from International Application No. PCT/US2011/054040, dated Oct. 30, 2012, 7 pp.

Response to Written Opinion from International Application No. PCT/US2011/054040 filed Jun. 13, 2012, 4 pp.

Response to Second Written Opinion from International Application No. PCT/US2011/054040 filed Dec. 26, 2012, 16 pp.

International Search Report and Written Opinion—PCT/US2011/054040—ISA/EPO—Feb. 2, 2012.

Sullivan et al., "Joint Model Reference Encoding Methods and Decoding Concealment Methods," JVT-J049, Hawaii, USA, Dec. 2003, 38 pp.

Karczewicz et al., "Video Coding Technology Proposal by Qualcomm Inc." (JCTVC-A121) Joint Collaborative Team on Video Coding (JCT-VC) of ITU-T SG16 WP3 and ISO/IECJTC1/SC29/WG11, 1st Meeting [Online] Apr. 15-23 2010, pp. 1-24.

Kim et al., "Fast H.264 Intra-prediction mode selection using joint spatial and transform domain features", Journal of Visual Communication and Image Representation, vol. 17 2006, pp. 291-310, XP002667270, Retrieved from the Internet: URL:http://viola.usc.edu/Publication/PDF/2006JNL/Kim-JVCI P-2006-April.pdf [retrieved on 2012-81-12] abstract.

Ding et al: "Fast mode decision for KTA software", IEEE International Symposium on Circuits and Systems. ISCAS 2010—May 30-Jun. 2, 2010—Paris, France, IEEE, US, May 30, 2010, pp. 397-400, XP031724956, ISBN: 978-1-4244-5308-5 p. 397, right-hand column.

Notice of Grounds for Rejection from Korean counterpart application No. 2013-7011289, dated Mar. 21, 2014, 6 pp.

First Office Action from Japanese counterpart application No. 2013-531867, mailed Jun. 3, 2014, 6 pp.

Notice of Grounds for Rejection from counterpart Korean Application No. 2013-7011289, dated Sep. 6, 2014, 6 pp.

Response to counterpart Office Action dated Jun. 3, 2014, from Japanese Application No. 2013-531867, filed on Sep. 1, 2014, 33 pp.

* cited by examiner

VIDEO CODING USING INTRA-PREDICTION

This application claims the benefit of U.S. Provisional Application No. 61/389,175, filed Oct. 1, 2010 and U.S. Provisional Application No. 61/500,014, filed Jun. 22, 2011, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into coding units, which may also be generally referred to as blocks. Each block can be further partitioned. Blocks in an intra-coded (I) frame or slice are encoded using spatial prediction with respect to neighboring reference blocks in the same frame or slice. Blocks in an inter-coded (P or B) frame or slice may use spatial prediction with respect to neighboring blocks in the same frame or slice or temporal prediction with respect to other reference frames.

SUMMARY

In general, this disclosure describes techniques for coding video data. In particular, this disclosure describes techniques for determining available modes for intra-coding video data. For example, this disclosure describes techniques for determining when an encoder or decoder may use a plane mode of intra-coding during an encoding or decoding process. This disclosure also describes techniques for signaling a selected intra-prediction mode. For example, techniques of this disclosure include signaling, by a video encoder, a selected intra-prediction mode by identifying a most probable mode and comparing the selected intra-prediction mode to the most probable mode. The techniques of this disclosure also include decoding such signaling, for example, by a video decoder.

In one example, a method includes determining a prediction characteristic associated with a coding unit of video data, wherein determining the prediction characteristic includes determining a prediction type that defines a number of prediction units associated with the coding unit. The method also includes generating a set of available intra-prediction modes for the coding unit based on the prediction characteristic, selecting an intra-prediction mode from the available intra-prediction modes, and applying one of the available intra-prediction modes to code the coding unit.

In another example, an apparatus for coding video data includes a processor configured to determine a prediction characteristic associated with a coding unit of video data, wherein determining the prediction characteristic includes determining a prediction type that defines a number of prediction units associated with the coding unit. The processor is also configured to generate a set of available intra-prediction modes for the coding unit based on the prediction characteristic, to select an intra-prediction mode from the available intra-prediction modes, and to apply one of the available intra-prediction modes to code the coding unit.

In another example, an apparatus for coding video data includes a means for determining a prediction characteristic associated with a coding unit of video data, wherein determining the prediction characteristic includes determining a prediction type that defines a number of prediction units associated with the coding unit. The apparatus also includes a means of generating a set of available intra-prediction modes for the coding unit based on the prediction characteristic. The apparatus also includes a means for selecting an intra-prediction mode from the available intra-prediction modes, and a means for applying one of the available intra-prediction modes to code the coding unit.

In another example, a computer program product comprises a computer-readable storage medium having stored thereon instructions that, when executed, cause a processor of a device for coding video data to determine a prediction characteristic associated with a coding unit of video data, wherein determining the prediction characteristic includes determining a prediction type that defines a number of prediction units associated with the coding unit, generate a set of available intra-prediction modes for the coding unit based on the prediction characteristic, select an intra-prediction mode from the available intra-prediction modes, and apply one of the available intra-prediction modes to code the coding unit.

The details of one or more examples are set forth in the accompanying drawings and the description below. Other features, objects, and advantages will be apparent from the description and drawings, and from the claims.

DETAILED DESCRIPTION

Figure 1:
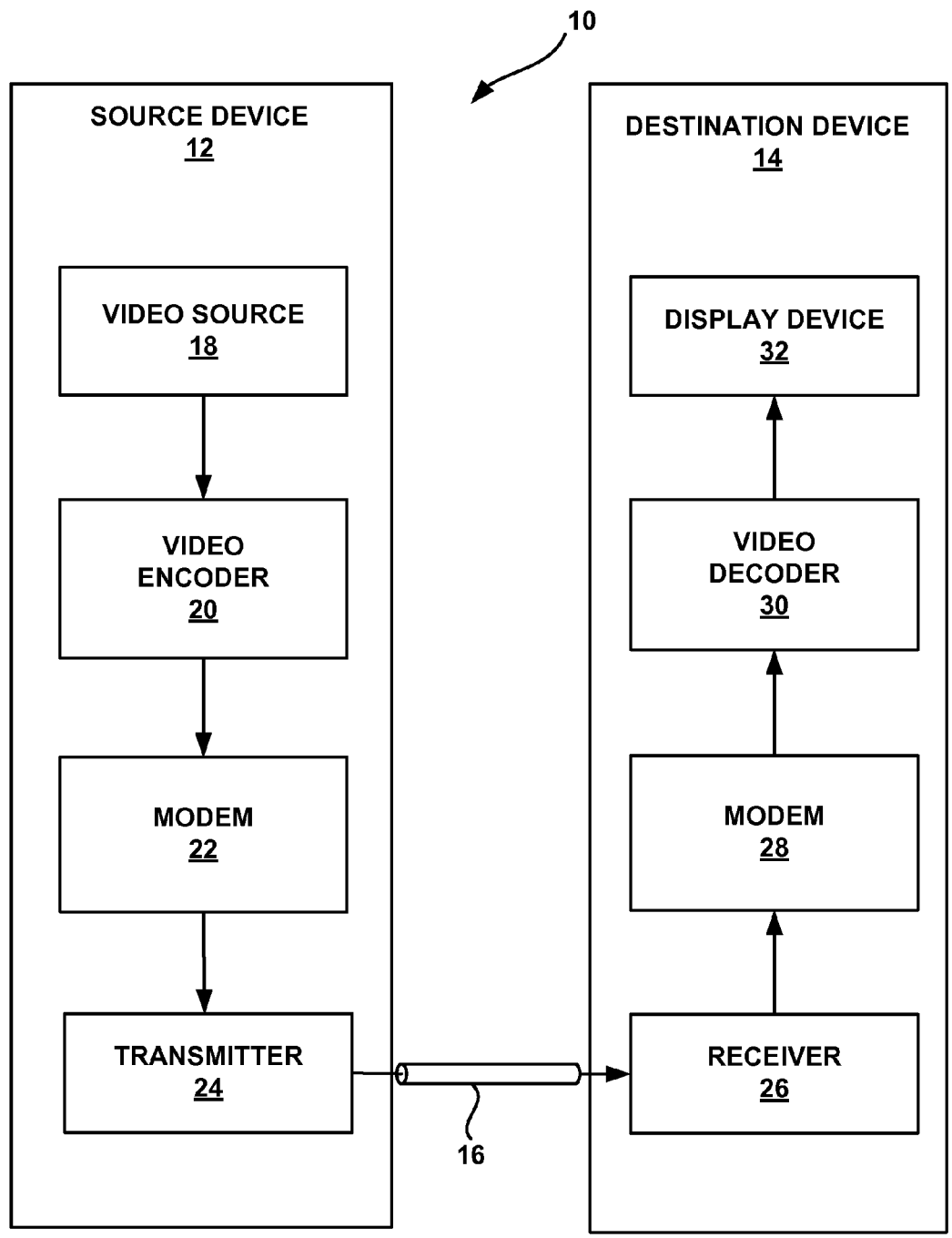
FIG. 1 is a block diagram illustrating an example video encoding and decoding system that may utilize techniques for determining available intra-prediction modes for coding a coding unit, according to aspects of the disclosure.

In general, this disclosure describes techniques for coding video data. In particular, this disclosure describes techniques relating to determining whether certain intra-prediction modes are available for purposes of prediction. According to aspects of this disclosure, an available intra-prediction mode may used by a video encoder and a video decoder to encode and decode video data, respectively. Alternatively, an intra-prediction mode may be referred to as being "unavailable" when the intra-prediction mode is excluded from being considered to encode or decode video data. For example, a prediction mode that is unavailable may be removed from consideration when selecting an intra-prediction mode to encode or decode a block of video data. Moreover, a prediction mode that is unavailable may not be signaled between a video encoder and a video decoder. Accordingly, as described in greater detail below, signaling overhead, that is, the number of bits required to signal available prediction modes between an encoder and decoder may be reduced by making certain intra-prediction modes unavailable.

Encoded video data may include prediction data and residual data. A video encoder may produce the prediction data using an intra-prediction mode or an inter-prediction mode. Intra-prediction generally involves predicting the pixel values in a block of a picture relative to reference samples in neighboring, previously coded blocks of the same picture. Inter-prediction generally involves predicting the pixel values in a block of a picture relative to data of a previously coded picture.

Following intra- or inter-prediction, a video encoder may calculate residual pixel values for the block. The residual values generally correspond to differences between the predicted pixel value data for the block and the true pixel value data of the block. For example, the residual values may include pixel difference values indicating differences between coded pixels and predictive pixels. In some examples, the coded pixels may be associated with a block of pixels to be coded, and the predictive pixels may be associated with one or more blocks of pixels used to predict the coded block. To further compress the residual value of a block, the residual value may be transformed into a set of transform coefficients that compact as much data (also referred to as "energy") as possible into as few coefficients as possible. The transform converts the residual values of the pixels from the spatial domain to a transform domain. The transform coefficients correspond to a two-dimensional matrix of coefficients that is ordinarily the same size as the original block. In other words, there are just as many transform coefficients as pixels in the original block. However, due to the transform, many of the transform coefficients may have values close or equal to zero.

The video encoder may then quantize the transform coefficients to further compress the video data. Quantization generally involves mapping values within a relatively large range to values in a relatively small range, thus reducing the entropy of transform coefficients. In some cases, quantization may reduce some values to zero. Following quantization, the video encoder may scan the transform coefficients, producing a one-dimensional vector from the two-dimensional matrix including the quantized transform coefficients. The video encoder may zero out certain coefficients prior to or following the scan, e.g., all but the upper-left corner of the matrix or all coefficients in the array from a position N to the end of the array.

The video encoder may then entropy encode the resulting array to even further compress the data. In some examples, the video encoder may be configured to use variable length codes (VLCs) to represent various possible quantized transform coefficients of the array, e.g., using context-adaptive variable-length coding (CAVLC). In other examples, the video encoder may be configured to use binary arithmetic coding to encode the resulting quantized coefficients, e.g., using context-adaptive binary arithmetic coding (CABAC).

Efforts are currently in progress to develop a new video coding standard, currently referred to as High Efficiency Video Coding (HEVC). The upcoming standard is also sometimes informally referred to as ITU-T H.265, although such a designation has not been formally made. The standardization efforts are based on a model of a video coding device referred to as the HEVC Test Model (HM). The HM presumes several capabilities of video coding devices over other devices according to, e.g., ITU-T H.264/AVC. For example, whereas H.264 provides nine intra-prediction encoding modes, HM provides as many as thirty-five intra-prediction encoding modes.

HM refers to a block of video data as a coding unit (CU). Syntax data within a bitstream may define a largest coding unit (LCU), which is a largest coding unit in terms of the number of pixels. In general, a CU has a similar purpose to a macroblock coded according to H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub- CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value may be transformed, quantized, and scanned. A TU is not necessarily limited to the size of a PU. Thus, TUs may be larger or smaller than corresponding PUs for the same CU. In some examples, the maximum size of a TU may be the size of the corresponding CU. This disclosure uses the term "block" to refer to any of a CU, PU, or TU.

In general, the techniques of this disclosure relate to determining available intra-prediction modes for predicting video data, for example, by a video encoder or a video decoder (referred to generally as "video coder"). In particular, the techniques of this disclosure include determining whether a plane intra-mode is available based on a characteristic of a CU, such as CU prediction type or CU prediction size. That is, aspects of the disclosure relate to determining whether a plane mode is available based on whether a CU is predicted as an undivided, 2N×2N prediction type or a split N×N prediction type. Aspects of the disclosure also relate to determining whether a plane mode is available based on a CU prediction size, e.g., 64×64 pixels, 32×32 pixels, 16×16 pixels, and the like. That is, aspects of the disclosure relate to determining a size of one or more PUs associated with a CU, and determining whether a plane mode is available based on the size of the PUs. The techniques of this disclosure also include determining when a plane mode is unavailable due to, for example, a block type or block size restriction, and modifying a most probable mode determination process accordingly.

As noted above, according to aspects of this disclosure, when a prediction mode is referred to as being "unavailable" for a particular block, the prediction mode is excluded from being considered by the encoder to encode or by the decoder to decode the particular block. For example, a prediction mode that is unavailable is removed from consideration when selecting a prediction mode to encode the block. Moreover, a prediction mode that is unavailable is not signaled in the bitstream communicated between an encoder and decoder, and is not used by the decoder to decode the block. Accordingly, signaling overhead, that is, the number of bits required to signal available prediction modes between an encoder and decoder may be reduced by making certain modes unavailable. In an example, a certain number of bits may be required to send information defining the thirty-five intra-prediction modes provided in HM from an encoder to a decoder. By making certain prediction modes unavailable, the number of bits required to send the remaining available prediction modes from the encoder to the decoder can be reduced, relative to the number of bits required to send the thirty-five intra-prediction modes provided in HM.

This disclosure generally refers to a CU "prediction type" defining a number of prediction units associated with the CU. That is, for example, a CU prediction type may identify whether a CU is predicted as a whole for intra-prediction purposes (e.g., which may also be referred to as "non splits"). For example, a CU may be referred to as being predicted as an undivided 2N×2N type (e.g., not split), meaning the CU is intra-predicted as a whole. That is, the CU has a single associated PU that is applicable to all pixels in the CU. A CU may also be referred to as being predicted as an N×N type (e.g., divided into four parts), meaning the CU may potentially be intra-predicted using more than one intra-prediction mode. For example, a CU that is predicted as an N×N type may be split into four blocks, with each of the blocks having a separate associated PU and an independent intra prediction mode signaled.

This disclosure also generally refers to "prediction size" as identifying pixel dimensions of one or more PUs associated with a CU in terms of vertical and horizontal dimensions. For example, a CU that is 64×64 pixels in size will have 64 pixels in a vertical direction (y=64) and 64 pixels in a horizontal direction (x=64). In one example, the CU may be predicted as an undivided 2N×2N type, and have a prediction size of 64×64 pixels (e.g., corresponding to a single, 64×64 pixel PU). Alternatively, the CU may be predicted as a split N×N type, having four associated PUs with prediction sizes of 32×32 pixels, each of which may include an independent intra-prediction mode.

An ITU-T H.264-compliant encoder may be configured with different available intra-prediction modes based on the size of the block being encoded. For example, a video encoder may select from four different available intra-prediction modes to encode a macroblock (16×16 pixels). In particular, a video encoder may select from a vertical intra-mode, a horizontal intra-mode, a DC intra-mode, and a plane intra-mode. In another example, for a block with 4×4 pixels, an H.264 compliant encoder may select from 9 different intra-modes. According to the H.264 specification, however, plane intra-mode is not available for a block of 4×4 pixels, because plane mode may work well in areas of smoothly-varying luminance, but may not work well for smaller sized blocks. Thus, an H.264 compliant encoder is limited to certain available intra-modes based on the size of the block to be encoded.

Techniques of this disclosure relate to providing a more flexible determination of when certain intra-modes are made available using the flexible CU coding structure of HM. For example, as described above, an H.264 compliant encoder is constrained to making certain intra-modes unavailable if a block being encoded is smaller than a macroblock. A CU in HEVC, however, does not have a size distinction. Accordingly, certain intra-modes not made available for blocks smaller than the macroblock in H.264 may still be a viable candidate for a variety of CUs and sub-CUs in HEVC coding, or other coding that does not have size distinctions for blocks.

Techniques of this disclosure include a more flexible approach in which an encoder or decoder may determine which intra-modes are available based on a characteristic of a CU to be encoded or decode. In an example, an encoder or decoder may determine which intra-modes are available based on a prediction type of a CU to be encoded. That is, for example, an encoder or decoder may determine which intra-modes are available based on a prediction type, which defines a number of prediction units associated with the CU being encoded or decoded (e.g., whether the CU is split for prediction purposes). In another example, the encoder or decoder may determine which intra-modes are available based on a CU prediction size (e.g., size of one or more PUs associated with a CU).

While certain techniques of this disclosure may be described with respect to a video encoder, it should be understood that the techniques may also be applied by a video decoder. For example, certain techniques for determining which intra-modes are available based on a prediction type of a CU or based on a CU prediction size may be described with respect to a video encoder for purposes of example. Such techniques may also be applied, however, by a video decoder to determine which intra-modes are available. Moreover, some techniques of this disclosure may be described with respect to a generic "video coder," which may comprise a video encoder or a video decoder, depending on the context in which the term is used. That is, a video coder may refer to a video encoder when described as encoding video data, while a video coder may refer to a video decoder when described as decoding video data.

When determining which intra-modes are available based on a CU prediction type, a video coder may consider whether the CU is predicted with a single PU, or whether the CU is predicted using more than one PU. For example, if the video coder determines that a CU has a 2N×2N prediction type, in which the CU is predicted as a whole, the video coder may make the plane intra-prediction mode available for predicting the CU. Alternatively, if the video coder determines that a CU has an N×N prediction type, in which the CU is predicted with multiple separate prediction modes, the video coder may make the plane intra-prediction unavailable for predicting the CU. In particular, the video encoder may not use nor signal the plane intra-prediction mode for the CU.

When determining which intra-modes are available based on a CU prediction size, a video coder may compare the size of a PU to a predetermined threshold size. For example, the video coder may only make the plane intra-prediction mode available for PUs that exceed a predetermined threshold size. According to some aspects of the disclosure, the video coder may make the plane intra-prediction mode available for PU sizes larger than 8×8 pixels. The 8×8 pixel threshold is provided merely as one example, however, and the video coder may implement alternative PU size thresholds (e.g., 4×4 pixels, 16×16 pixels, and the like).

Techniques of this disclosure include configuring an encoder and decoder with the same criteria for determining the set of available intra-modes, e.g., with both encoder and decoder configured with the same predetermined type or size threshold. Techniques of this disclosure also include signaling, by an encoder, the criteria for determining the set of available intra-modes in a sequence header or a slice header as a parameter. Signaling the criteria for determining the set of available intra-modes may allow different sequences or slices of a frame may have different criteria for determining the set of available intra-modes.

Certain aspects of the disclosure also relate to signaling an intra-prediction mode. In an example, a video encoder may signal the intra-prediction mode for a block based on a context model. That is, the video encoder may identify the intra-prediction mode of previously encoded blocks surrounding a block currently being encoded. The video encoder may then signal the intra-prediction mode of the current block based on whether the intra-prediction mode for the current block is the same as the intra-prediction mode of the previously encoded surrounding blocks. A video decoder may receive such signaling and decode the signal using the same criteria applied by the encoder. That is, the video decoder may apply the same context model as the video encoder to determine the intra-prediction mode used to encode a block.

In some examples, the encoder may identify the intra-prediction mode of the previously encoded blocks to the relative top and left of the block to be encoded as being the most probable intra-prediction mode for a block to be encoded. If the intra-prediction mode for the current block is actually the same as the most probable mode, the encoder may signal the intra-prediction mode using a one bit most probable mode flag. That is, the video encoder can signal that the intra-prediction mode for a current block is the same as the most probable mode, without having to explicitly identify the intra-prediction mode for the current block. According to aspects of the disclosure, the video encoder may signal that the intra-prediction mode for a current block is the same as the most probable mode, even when the most probable mode (e.g., the mode of the surrounding blocks) is the plane mode. A video decoder, then, may receive the most probable mode flag and use the same process to determine the most probable mode, thereby identifying an intra-mode used to predict a received block. If the intra-prediction mode for a current block is not the same as the most probable mode, the video encoder may signal the intra-mode for the current block using additional bits.

Techniques of this disclosure include signaling an intra-prediction mode based on the most probable mode, even when the most probable mode is plane intra-mode and the plane intra-mode is not available for a block being encoded. For example, aspects of the disclosure relate to identifying whether plane intra-mode is available based on a characteristic of the CU being encoded. If plane intra-mode is not available, e.g., due to a CU prediction type or CU prediction size restriction, a video encoder may implement a modified most probable mode signaling process. For example, the encoder may map the intra-prediction mode of neighboring blocks using plane intra-mode to another intra-mode, such as DC mode. In this example, identifying the most probable mode can then proceed as normal. That is, with the neighbors mapped to a mode that is not plane mode, the video encoder can signal the most probable mode without the possibility of selecting the unavailable plane mode. In addition, a video decoder may apply the same neighbor mapping scheme as the video encoder to determine the most probable mode without the possibility of selecting the unavailable plane mode.

In another example, the video encoder may first identify the most probable mode without modification of the neighboring modes. If the video encoder determines that the most probable mode is plane mode and the plane mode is unavailable, the video encoder may instead select another mode, such as DC mode. According to some aspects of the disclosure, a video encoder and a video decoder may be configured with the same most probable mode signaling process when plane mode is not available. That is, for example, if the video decoder determines that the most probable mode is plane mode and the plane mode is unavailable, the video decoder may instead select the same mode as the video encoder, such as DC mode.

According to some aspects of this disclosure, a video encoder may signal all available intra-prediction modes, including plane intra-prediction mode, using unique mode identifiers. That is, for example, the video encoder may generate unique identification numbers for each available intra-prediction mode, including plane intra-prediction mode when available, and transmit the identification numbers to a video decoder. The video decoder may then use the received identification numbers to identify an intra-prediction mode used by the encoder to encode the video data. For example, video decoder may identify the available intra-prediction modes and decode the intra-prediction mode signaled by the video encoder from the available intra-prediction modes.

In this manner, a video encoder and video decoder may determine a set of available intra-prediction modes based on a characteristic of a CU being encoded. For example, a video coder may determine a set of available intra-prediction modes based on a prediction type of CU being encoded (e.g., 2N×2N, N×N, and the like), and include a plane intra-prediction mode in the set of available modes only when a CU is predicted as an undivided 2N×2N type. In another example, the video coder may determine a set of available intra-prediction modes based on a CU prediction size (e.g., 64×64 pixels, 32×32 pixels, 16×16 pixels, and the like), and include a plane intra-prediction mode in the set of available modes only when a PU associated with the CU is larger than a predetermined size threshold (e.g., 8×8 pixels). In addition, a video encoder may signal the selected intra-mode based on the most probable intra-mode, regardless of whether all modes are available for intra-coding the current block. A video decoder may receive such signaling and decode the signal using the same criteria applied by the video encoder.

FIG. 1 is a block diagram illustrating an example video encoding and decoding system 10 that may utilize techniques for determining available intra-modes for coding a coding unit. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern determining available intra-modes for coding a coding unit, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission or storage of encoded video data.

In the example of FIG. 1, source device 12 includes a video source 18, a video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for determining available intra-modes of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining available intra-modes for coding a coding unit may be performed by any digital video encoding and/or decoding device. Although the techniques of this disclosure are generally performed by a video encoding device or a video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to determine available intra-modes for coding a coding unit, select an intra-mode, and signal the selected intra-mode. The information communicated over channel 16 may include syntax information defined by video encoder 20, which is also used by video decoder 30, that includes syntax elements that describe characteristics and/or processing of coding units or other units of coded video data, e.g., groups of pictures (GOPs), slices, frames and the like. A quadtree data structure may form part of the syntax information for a largest coding unit. That is, each LCU may include syntax information in the form of a quadtree, which may describe how the LCU is split into sub-CUs as well as signaling information on how the LCU and sub-CUs are encoded.

Video decoder 30 may implement one or more of the techniques described herein to determine available intra-modes for coding a coding unit. In addition, video decoder 30 may use the quadtree to determine how to decode CUs of a received picture. Video decoder 30 may then decode the CUs and send decoded video data to display device 32. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). As another example, video encoder 20 and video decoder 30 may operate according to the High Efficiency Video Coding (HEVC) standard, and may conform to the HEVC Test Model (HM). The techniques of this disclosure, however, are not limited to any particular coding standard, and may apply to HEVC or other standards or proprietary coding processes that are currently available or may emerge in the future. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented in software, a device may store instructions for the software in a suitable, non-transitory computer-readable medium and execute the instructions using one or more processors to perform the techniques of this disclosure. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on coding units within individual video frames in order to encode the video data. A coding unit may correspond to an LCU or a sub-CU, and the term CU may refer to an LCU or a sub-CU. Header information for an LCU may describe the size of the LCU, the number of times the LCU may be split (referred to as CU depth in this disclosure), and other information. Each video frame may include a plurality of slices, and each slice may include a plurality of LCUs.

As an example, the HEVC Test Model (HM) supports prediction in various CU sizes. The size of an LCU may be defined by syntax information. Assuming that the size of a particular CU is 2N×2N, the HM supports intra-prediction in types 2N×2N or N×N, and inter-prediction in symmetric types 2N×2N, 2N×N, N×2N, or N×N.

In this disclosure, "N×N" and "N by N" may be used interchangeably to refer to the pixel dimensions of a block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

PUs of a CU may comprise pixel data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. The residual data generally represents pixel differences between original values of a PU and the predictive values of the PU. The TUs may include quantized values in the transform domain. When a transform is used to transform the residual data of a TU into transform coefficients, the coefficients of the TU may be said to be in the frequency domain.

Video encoder 20 and video decoder 30 may implement any or all of the techniques of this disclosure to determine available intra-modes for coding a coding unit. In general the techniques of this disclosure are directed to determining available intra-modes for coding a coding unit. However, certain aspects of this disclosure may also be implemented with respect to inter-prediction encoding and/or decoding. For purposes of example, these techniques are described relative to intra-prediction encoding and decoding of CUs. It should be understood that these techniques may also be performed in conjunction with inter-prediction encoding and/or decoding.

Video encoder 20 may receive an LCU and determine whether to split the LCU into four quadrants, each comprising a sub-CU, or whether to encode the LCU without splitting. Following a decision to split an LCU into sub-CUs, video encoder 20 may determine whether to split each sub-CU into four quadrants, each comprising a sub-CU. Video encoder 20 may continue to recursively determine whether to split a CU, with a maximum number of splits indicated by the LCU depth. Video encoder 20 may provide a quadtree data structure indicative of the splitting of an LCU and sub-CUs of the LCU. The LCU may correspond to a root node of the quadtree. Each node of the quadtree may correspond to a CU of the LCU. Moreover, each node may include a split flag value indicative of whether the corresponding CU is split.

If the LCU is split, for example, video encoder 20 may set the value of the split flag in the root node to indicate that the LCU is split. Then, video encoder 20 may set values of child nodes of the root node to indicate which, if any, of the sub-CUs of the LCU are split. A CU that is not split may correspond to a leaf node of the quadtree data structure, where a leaf node has no child nodes.

Video encoder 20 may encode each sub-CU of the LCU corresponding to a leaf node in the quadtree data structure.

For purposes of example, this disclosure describes the techniques relative to intra-prediction encoding. Thus, under this assumption, video encoder 20 may form prediction units (PUs) for each CU corresponding to a leaf node in the quadtree data structure. Video encoder 20 may intra-code each CU by first classifying the CU into a prediction type. That is, for example, video encoder 20 may determine whether to predict the CU with a single, 2N×2N PU, or whether to split the CU and utilize four PUs to predict the CU. According to aspects of this disclosure, video encoder 20 may also determine a size of each of the PUs used to predict the CU.

In accordance with techniques of the disclosure, video encoder 20 and video decoder 30 may determine available intra-modes based on a characteristic of the CU to be encoded. In an example, video encoder 20 or video decoder 30 may determine which intra-modes are available based on a prediction type of a CU to be encoded or decoded. That is, for example, an video encoder 20 or video decoder 30 may determine which intra-modes are available based on a prediction type, which defines a number of prediction units associated with the CU being encoded or decoded (e.g., whether the CU is split for prediction purposes). In another example, video encoder 20 or video decoder 30 may determine which intra-modes are available based on a CU prediction size (e.g., size of one or more PUs associated with a CU) of a CU to be encoded or decoded. In particular, one or more intra-prediction modes may be unavailable for particular certain prediction types, such as an N×N prediction type. Likewise, for CU prediction size less than a predetermined threshold size, one or more intra-prediction modes may be unavailable.

Regarding video encoder 20, when determining which intra-modes are available based on a CU prediction type, video encoder 20 may consider whether the CU is predicted with a single PU, or whether the CU is predicted using more than one PU. For example, if video encoder 20 classifies the CU as a 2N×2N prediction type, in which video encoder 20 predicts the CU as a whole with a single PU, video encoder 20 may make the plane intra-prediction mode available for predicting the CU. Alternatively, if video encoder 20 classifies the CU as an N×N prediction type, in which video encoder 20 splits the CU for prediction purposes (e.g., splits the CU into four sections, and predicts each of the sections with a separate PU), video encoder 20 may make the plane intra-mode unavailable for the PUs associated with the CU.

When determining which intra-modes are available based on a CU prediction size, video encoder 20 may compare the size of a PU to a predetermined threshold size. For example, video encoder 20 may only make the plane intra-prediction mode available for PUs that exceed a predetermined threshold size, and unavailable for PUs that are less than or equal to the predetermined threshold size. According to some aspects of the disclosure, video encoder 20 may make the plane intra-prediction mode available for PU sizes larger than 8×8 pixels, but other thresholds may also be used (e.g., 4×4 pixels, 16×16 pixels, and the like).

Following intra-predictive or inter-predictive coding to produce a PU for a CU, video encoder 20 may calculate residual data to produce one or more transform units (TUs) for the CU. The residual data may correspond to pixel differences between pixels of a PU of a CU and their prediction values. Video encoder 20 may form one or more TUs based on the residual data for the CU. Video encoder 20 may then transform the TUs. In accordance with the techniques of this disclosure, video encoder 20 may select a transform based on an intra-prediction mode used to predict a PU for the CU.

By transforming residual data for a TU, video encoder 20 produces a matrix of transform coefficients. This matrix generally has the same size as the input block to the transform. In general, quantization is applied to transform coefficients, which further compresses the data. Quantization generally refers to a process in which transform coefficients are quantized to possibly reduce the entropy of data used to represent the coefficients. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a vector that can be entropy encoded. In other examples, video encoder 20 may perform an adaptive scan.

After scanning the transform matrix to form a one-dimensional vector, video encoder 20 may entropy encode the one-dimensional vector, e.g., according to content adaptive variable length coding (CAVLC), context adaptive binary arithmetic coding (CABAC), syntax-based context-adaptive binary arithmetic coding (SBAC), or another entropy coding methodology.

To perform CAVLC, video encoder 20 may select a variable length code for a symbol to be transmitted. Codewords in VLC may be constructed such that relatively shorter codes correspond to more likely symbols, while longer codes correspond to less likely symbols. In this way, the use of VLC may achieve bit rate savings over, for example, using equal-length codewords for each symbol to be transmitted.

To perform CABAC, video encoder 20 may select a context model to apply to a certain context to encode symbols to be transmitted. The context may relate to, for example, whether neighboring values are non-zero or not. Video encoder 20 may also entropy encode syntax elements, such as a significant coefficient flag and a last coefficient flag produced when performing an adaptive scan. In accordance with the techniques of this disclosure, video encoder 20 may select the context model used to encode these syntax elements based on, for example, an intra-prediction direction, a scan position of the coefficient corresponding to the syntax elements, block type, and/or transform type, among other factors used for context model selection.

According to techniques of this disclosure, video encoder 20 may signal a selected intra-prediction mode by encoding a CU based on a most probable mode. For example, video encoder 20 may signal the intra-prediction mode for a current block based on a context model that includes previously encoded blocks. In an example, video encoder 20 may determine a most probable mode based on previously encoded blocks that border the current block to the relative top and relative left, assuming a left-to-right, top-to-bottom encoding order for blocks. These blocks may have a high probability of having the same intra-mode as the current block.

In one example, if the blocks to the top and left of the current block are encoded with different modes, video encoder 20 may select the intra-mode having the lower numerical ranking as the most probable mode, according to a predefined ranking of intra-modes maintained by video encoder 20. In another example, if the blocks to the top and left of the current block are encoded with different modes, video encoder 20 may select a predefined default mode, such as DC intra-mode, as the most probable mode. The process of selecting a most probable mode when the context of a current block includes more than one intra-mode, however, are provided as examples only, and video encoder 20 and video decoder 30 may be configured to determine a most probable mode in a variety of other ways.

After determining the most probable intra-mode, video encoder 20 may set a flag (e.g., a most_probable_mode flag) based on a comparison of the most probable mode to the selected intra-mode used to encode a current block. For example, if the most probable mode is the same as the selected intra-mode for the current block, video encoder 20 may set the most probable mode flag to a value of 1, indicating that the selected and most probable modes are the same. In this example, no additional bits are required to signal the selected mode. That is, upon receiving a most probable mode flag that has been set to 1, video decoder 30 may reproduce the same procedure for determining the most probable mode, e.g., as used by the encoder, and then use the most probable mode to decode the received block.

If the most probable mode is not the same as the selected intra-mode for the current block, video encoder 20 may set the most probable mode flag to a value of 0, indicating that the modes are not the same. In this example, additional bits may be required to signal the actual intra-mode used to encode the current block to the video decoder 30. According to some examples, video encoder 20 may maintain a numerical ranking of the intra-modes, with the most often used intra-modes having the lowest numerical ranking. In such examples, video encoder 20 may signal the actual intra-mode used to encode the current block based on the numerical ranking or another numerical identifier. For example, according to some aspects of this disclosure, video encoder 20 may signal all available intra-prediction modes, including plane intra-prediction mode, using unique mode identifiers. That is, for example, the video encoder 20 may generate unique identification numbers for each available intra-prediction mode, including plane intra-prediction mode when available, and transmit the identification numbers to video decoder 30.

According to aspects of the disclosure, video encoder 20 may implement a modified most probable mode derivation process if the plane mode is identified as the most probable mode, and the plane mode is not available for the current block, e.g., based on prediction type or PU size. In an example, when video encoder 20 determines that plane intra-mode is the most probable mode but plane intra-mode is not available for the current block due to, for example, a prediction type or prediction size restriction, video encoder 20 may map the intra-prediction mode of neighboring blocks to another intra-mode, such as DC mode. Video encoder 20 may then proceed to determine the most probable mode based on the mapped neighbors.

In another example, video encoder 20 may identify the most probable mode without modification of the neighboring modes. That is, if video encoder 20 determines that the most probable mode is plane mode and plane mode is unavailable for the current block, video encoder 20 may instead select a predefined default mode as the most probable mode for the current block. In one example, video encoder 20 may select the DC intra-mode as the predefined default mode.

While certain techniques of this disclosure may be described with respect to video encoder 20, it should be understood that the techniques may also be applied by video decoder 30. For example, video decoder 30 may operate in a manner essentially symmetrical to that of video encoder 20. Video decoder 30 may receive entropy encoded data representative of an encoded CU, including encoded PU and TU data. This received data may include information indicative of an intra-prediction mode used to encode the PU data, assuming the CU was intra-prediction encoded. Video decoder 30 may entropy decode (or parse) the received data, forming encoded quantization coefficients.

When video encoder 20 entropy encodes data using a variable length code algorithm, video decoder 30 may use one or more VLC tables to determine a symbol corresponding to a received codeword. When video encoder 20 entropy encodes data using an arithmetic coding algorithm, video decoder 30 may use a context model to decode the data, which may correspond to the same context model used by video encoder 20 to encode the data. That is, according to aspects of this disclosure, when video encoder 20 alters a VLC table or context model, due to, for example, a prediction type or prediction size restriction, video decoder 30 may apply a similar restriction to update the VLC table or context model.

Video decoder 30 may then inverse scan the decoded coefficients, using an inverse scan that mirrors the scan used by video encoder 20. To inverse adaptively scan the coefficients, video decoder 30 may decode syntax elements including significant coefficient flags and last coefficient flags to regenerate the statistics used by video encoder 20 to perform the adaptive scan. Video decoder 30 may thereby form a two-dimensional matrix, from the one-dimensional vector resulting from the entropy decoding process.

Next, video decoder 30 may inverse quantize the coefficients in the two-dimensional matrix produced by the inverse scan. Video decoder 30 may then apply one or more inverse transforms to the two-dimensional matrix. The inverse transforms may correspond to the transforms applied by video encoder 20. Video decoder 30 may determine the inverse transforms to apply based on, for example, the intra-prediction mode used to form the PU.

In accordance with techniques of this disclosure, video decoder 30 may identify the intra-mode used to encode the data based on the same criteria applied by video encoder 20. For example, video decoder 30 may determine available intra-modes based on a characteristic of the CU to be decoded. That is, for example, video decoder 30 may determine which intra-modes are available based on a prediction type of a CU to be decoded. In another example, video decoder 30 may determine which intra-modes are available based on a CU prediction size (e.g., size of one or more PUs associated with a CU).

According to some aspects of the disclosure, after determining the available intra-prediction modes, video decoder 30 can identify the intra-prediction mode signaled by video encoder 20. That is, video decoder 30 can identify the same available intra-prediction modes identified by video encoder 20, and use the identified available intra-prediction modes to decode an intra-prediction mode signaled by video encoder 20 (e.g., signaled using a unique identifier). In some examples, video decoder 30 may receive and decode a unique identification number for plane intra-mode, when available, in the same manner as other intra-prediction modes.

According to some aspects of the disclosure, video encoder 20 may signal the criteria for determining the set of available intra-modes in a sequence header or a slice header as a parameter. Signaling the criteria for determining the set of available intra-modes may allow different sequences or slices of a frame to have different criteria for determining the set of available intra-modes. Video encoder 20 and video decoder 30 may also be configured to carry out the most probable mode derivation process in the same way.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FP- GAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
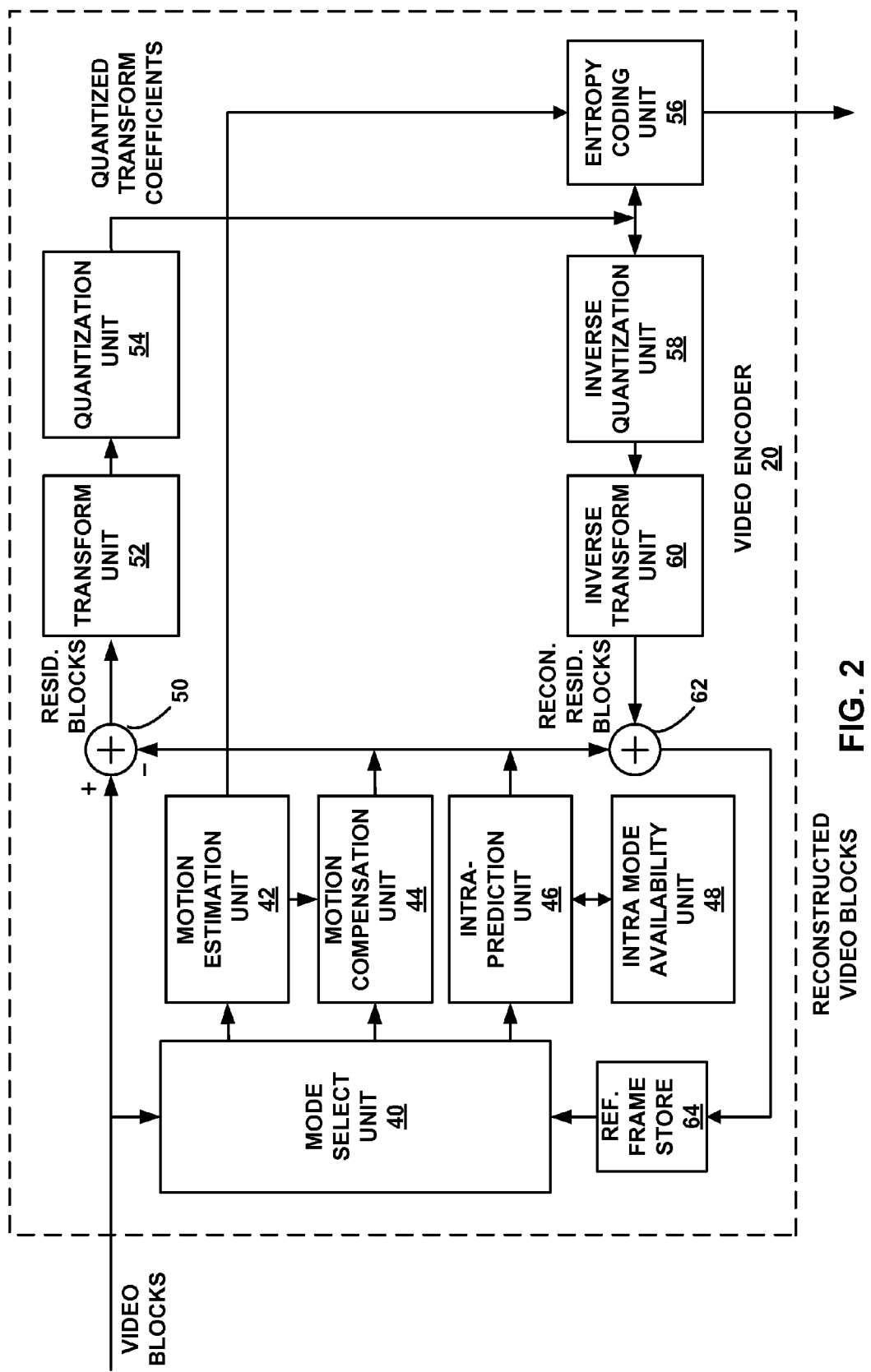
FIG. 2 is a block diagram illustrating an example of a video encoder that may implement any or all of the techniques for determining available intra-prediction modes, selecting an intra-prediction mode, and signaling the selected intra-prediction mode, according to aspects of the disclosure.

FIG. 2 is a block diagram illustrating an example of video encoder 20 that may implement any or all of the techniques for determining available intra-prediction modes, selecting an appropriate intra-prediction mode, and signaling the intra-prediction mode described in this disclosure. Video encoder 20 may perform intra- and inter-coding of CUs within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

As shown in FIG. 2, video encoder 20 receives a current video block within a video frame to be encoded. In the example of FIG. 2, video encoder 20 includes motion compensation unit 44, motion estimation unit 42, intra-prediction unit 46, reference frame store 64, summer 50, transform unit 52, quantization unit 54, and entropy coding unit 56. Transform unit 52 illustrated in FIG. 2 is the unit that performs the actual transformation, not to be confused with a TU of a CU. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results versus the number of bits required to signal the video data under each coding mode (e.g., sometimes referred to as rate-distortion), and provides the resulting intra- or inter-coded block to summer 50 to generate residual block data and to summer 62 to reconstruct the encoded block for use in a reference frame. Some video frames may be designated I-frames, where all blocks in an I-frame are encoded in an intra-prediction mode. In some cases, intra-prediction unit 46 may perform intra-prediction encoding of a block in a P- or B-frame, e.g., when motion search performed by motion estimation unit 42 does not result in a sufficient prediction of the block.

Motion estimation unit 42 and motion compensation unit 44 may be highly integrated, but are illustrated separately for conceptual purposes. Motion estimation is the process of generating motion vectors, which estimate motion for video blocks, for inter-coding. A motion vector, for example, may indicate the displacement of a prediction unit in a current frame relative to a reference sample of a reference frame. A reference sample is a block that is found to closely match the portion of the CU including the PU being coded in terms of pixel difference, which may be determined by sum of absolute difference (SAD), sum of square difference (SSD), or other difference metrics. Motion compensation, performed by motion compensation unit 44, may involve fetching or generating values for the prediction unit based on the motion vector determined by motion estimation. Again, motion estimation unit 42 and motion compensation unit 44 may be functionally integrated, in some examples.

Motion estimation unit 42 calculates a motion vector for a prediction unit of an inter-coded frame by comparing the prediction unit to reference samples of a reference frame stored in reference frame store 64. In some examples, video encoder 20 may calculate values for sub-integer pixel positions of reference frames stored in reference frame store 64. For example, video encoder 20 may calculate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision. Motion estimation unit 42 sends the calculated motion vector to entropy coding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction unit 46 may perform intra-prediction for coding the received block, as an alternative to inter-prediction performed by motion estimation unit 42 and motion compensation unit 44. Intra-prediction unit 46 may encode the received block relative to neighboring, previously coded blocks, e.g., blocks above, above and to the right, above and to the left, or to the left of the current block, assuming a left-to-right, top-to-bottom encoding order for blocks. Intra-prediction unit 46 may be configured with a variety of different intra-prediction modes. For example, intra-prediction unit 46 may be configured with a certain number of prediction modes, e.g., 35 prediction modes, based on the size of the CU being encoded.

Intra-prediction unit 46 may select an intra-prediction mode from the available intra-prediction modes by, for example, calculating rate-distortion (e.g., attempting to maximize compression without exceeding a predetermined distortion) for various intra-prediction modes and selecting a mode that yields the best result. Intra-prediction modes may include functions for combining values of spatially neighboring pixels and applying the combined values to one or more pixel positions in a predictive block that is used to predict a PU. Once values for all pixel positions in the predictive block have been calculated, intra-prediction unit 46 may calculate an error value for the prediction mode based on pixel differences between the PU and the predictive block. Intra-prediction unit 46 may continue testing intra-prediction modes until an intra-prediction mode that yields an acceptable error value versus bits required to signal the video data is discovered. Intra-prediction unit 46 may then send the PU to summer 50.

According to techniques of this disclosure, intra-prediction unit 46 may use intra-mode availability unit 48 to determine which intra-modes are available for prediction purposes. In some examples, intra-mode availability unit 48 may limit the number of intra-modes available for predicting a certain block. For example, as currently proposed, the HM specification supports up to 35 intra-prediction modes (as described in greater detail, for example, with respect to FIG. 4). Certain modes, however, may not be efficient for all sized blocks. In an example, plane intra-mode may include a linear plane function that is fitted to the block for prediction purposes. The plane intra-mode may work well in areas of smoothly-varying luminance. Plane intra-mode may be worthwhile for predicting larger blocks, but may not be efficient for predicting smaller blocks. That is, the prediction error reduction achieved by having plane intra-mode available to a relatively small block may be outweighed by the signaling overhead associated with having plane intra-mode available.

Figure 3:
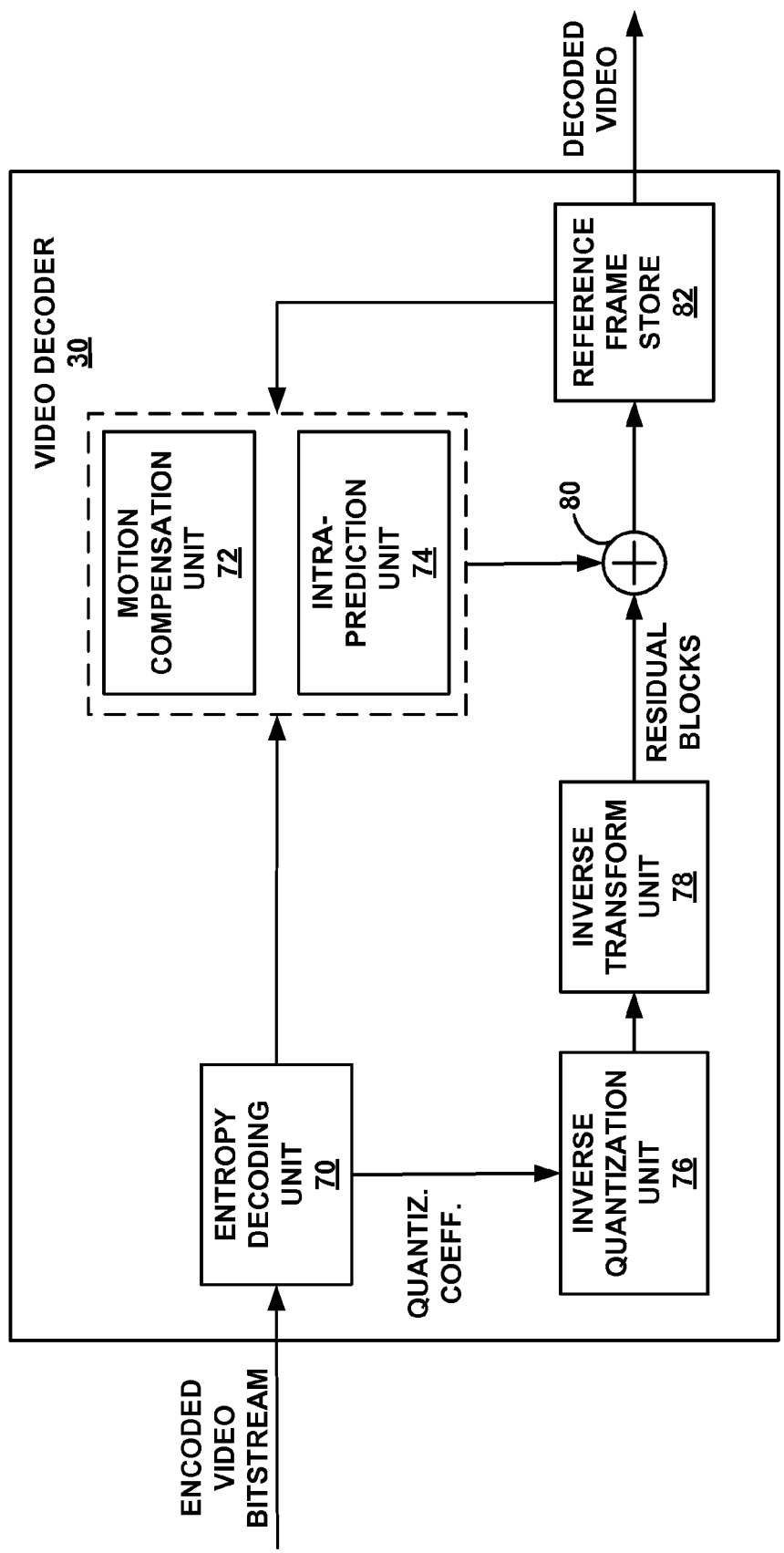
FIG. 3 is a block diagram illustrating an example of video decoder for determining available intra-prediction modes for coding a coding unit and decoding an encoded video sequence, according to aspects of the disclosure.

Aspects of the disclosure relate to limiting the availability of plane intra-prediction mode based on a characteristic of a CU to be encoded. That is, intra-mode availability unit 48 may determine whether plane intra-mode is available based on, for example, a prediction type associated with a current CU to be encoded (e.g., which defines a number of prediction units associated with the CU) or a prediction size associated with the current CU. For example, intra-mode availability unit 48 may be configured to determine which intra-modes are available based on whether a prediction type of a current CU being encoded is 2N×2N or N×N. According to some aspects of the disclosure, intra-mode availability unit 48 may make plane intra-mode available for a prediction type of 2N×2N, but unavailable for a prediction type of N×N. If intra-mode availability unit 48 makes plane intra-mode unavailable, intra-prediction unit 46 may not use plane intra-prediction mode when encoding the current CU. In this case, video encoder 20 does not signal plane intra-mode, and the signaling overhead associated with signaling the available intra-prediction modes may be reduced, because fewer intra-prediction modes are available. For example, video encoder 20 does not include plane intra-mode in a set of available intra-modes that are transmitted to a video decoder, such as video decoder 30 (FIGS. 1 and 3).

In another example, intra-mode availability unit 48 may be configured to determine which intra-modes are available based on a comparison of a size of a prediction unit (PU) associated with the current CU to a predetermined threshold size. In this example, intra-mode availability unit 48 may be preprogrammed with a predetermined threshold size. One example threshold size may be 8×8 pixels, although other sizes may be used (e.g., 4×4 pixels, 16×16 pixels, and the like). According to some aspects of the disclosure, intra-mode availability unit 48 may make plane intra-mode available for PU sizes greater than the threshold size, but unavailable for PU sizes that are equal to or smaller than the threshold size. As with the prediction type restriction described above, if intra-mode availability unit 48 makes plane intra-mode unavailable, intra-prediction unit 46 may not use plane intra-prediction mode when encoding the current CU. In this case, video encoder 20 does not signal plane intra-mode, and the signaling overhead associated with signaling the available intra-prediction modes may be reduced, because fewer intra-prediction modes are available.

Again, it should be understood that certain components of video encoder 20, such as intra-prediction unit 46 and intra-mode availability unit 48, may be highly integrated or included in the same physical component, but are illustrated separately for conceptual purposes.

Video encoder 20 forms a residual block by subtracting the prediction data calculated by motion compensation unit 44 or intra-prediction unit 46 from the original video block being coded. Summer 50 represents the component or components that perform this subtraction operation. The residual block may correspond to a two-dimensional matrix of values, where the number of values in the residual block is the same as the number of pixels in the PU corresponding to the residual block. The values in the residual block may correspond to the differences between collocated pixels in a predictive block and in the original block to be coded.

Transform unit 52 applies a transform, such as a discrete cosine transform (DCT), integer transform, or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. Transform unit 52 may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding (CABAC), context may be based on neighboring coding units.

In some cases, entropy coding unit 56 or another unit of video encoder 20 may be configured to perform other coding functions, in addition to entropy coding. For example, entropy coding unit 56 may be configured to determine the CBP values for the coding unit and partitions. Also, in some cases, entropy coding unit 56 may perform run length coding of the coefficients in a coding unit or partition thereof. In particular, entropy coding unit 56 may apply a zig-zag scan or other scan pattern to scan the transform coefficients in a coding unit or partition and encode runs of zeros for further compression. Entropy coding unit 56 also may construct header information with appropriate syntax elements for transmission in the encoded video bitstream.

In some examples, entropy coding unit 56 may be configured to signal all available intra-prediction modes, including plane intra-prediction mode, using unique mode identifiers. That is, for example, entropy coding unit 56 may generate unique identification numbers for each available intra-prediction mode, including plane intra-prediction mode when available. According to some examples, entropy coding unit 56 may transmit the unique identification numbers for each available intra-prediction mode by selecting a variable length codeword for each identification number to be transmitted. In this example, when one or more intra-prediction modes are unavailable due to a prediction type or prediction size restriction, entropy coding unit 56 may not signal the unavailable modes, thereby reducing the overhead in intra-prediction mode signaling to a video decoder.

According to some aspects of the disclosure, entropy coding unit 56 may be configured to set a flag, e.g., a most_probable_mode flag, when encoding a block that has been intra-predicted. For example, entropy coding unit 56 may be configured to determine a most probable intra-mode for a current block based on a context model that includes previously encoded blocks. In some examples, entropy coding unit 56 may determine a most probable mode based on the previously encoded blocks to the left and top of the current block, assuming a left-to-right, top-to-bottom encoding order for blocks. If the blocks to the top and left of the current block are encoded with different modes, entropy coding unit 56 may select the intra-mode having the lower numerical ranking as the most probable mode, according to a predefined ranking of intra-modes maintained by entropy coding unit 56, or may select a predefined default mode, such as DC intra-mode, as the most probable mode.

Entropy coding unit 56 may set the most probable mode flag according to a comparison of the most probable mode and the selected intra-mode used to encode a current block. If the most probable mode is the same as the selected intra-mode for the current block, entropy coding unit 56 may set the most probable mode flag to a value of 1, indicating that the modes are the same. In this example, no additional bits are required to signal the selected mode. If the most probable mode is not the same as the selected intra-mode for the current block, entropy coding unit 56 may set the most probable mode flag to a value of 0, indicating that the modes are not the same. In this example, additional bits may be required to signal the actual intra-mode used to encode the current block to the video decoder 30. According to some examples, entropy coding unit 56 may maintain a numerical ranking of the intra-modes, with the most often used intra-modes having the lowest numerical ranking. This ranking may be based, for example, on predefined statistics, or may be dynamically updated according to the number of occurrences that intra-prediction unit 46 applies the intra-modes. In such examples, entropy coding unit 56 may signal the actual intra-mode used to encode the current block according to the numerical ranking of the intra-mode. That is, entropy coding unit 56 may identify the selected intra-mode using an identifier or codeword that corresponds to the numerical ranking of the intra-mode.

Techniques of this disclosure include altering the most probable mode derivation process if entropy coding unit 56 determines that the most probable mode is plane mode, and plane mode is not available for the current block (e.g., due to a prediction type or prediction size restriction). In an example, if entropy coding unit 56 determines that plane intra-mode is unavailable for a current block, entropy coding unit 56 may map the intra-prediction mode of neighboring blocks using the plane intra-prediction mode to another intra-mode. In some examples, entropy coding unit 56 may map the intra-mode of neighboring blocks using the plane intra-mode to DC mode, although any of the other intra-modes may also be used. Entropy coding unit 56 may then proceed to determine the most probable mode based on the mapped neighbors.

In another example, if entropy coding unit 56 determines that the most probable mode is plane mode and plane mode is unavailable, entropy coding unit 56 may instead select a predefined default mode. In one example, video encoder 20 may select DC intra-mode as the predefined default mode, although any of the other intra-modes may also be used.

Although described with respect to entropy coding unit 56 for purposes of example, it should be understood that the most probable mode determination process may be carried out by another component of video encoder 20, such as intra-prediction unit 46. In this example, intra-prediction unit 46 may determine the appropriate value of the most probable mode flag, while entropy coding unit 56 may set the value of the flag in the bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

In this manner, video encoder 20 is an example of a video encoder configured to determine an available set of intra-prediction modes based on a prediction characteristic of the coding unit (CU) being predicted. In particular, video encoder 20 is an example of a video encoder configured to determine whether a plane intra-prediction mode is available based on a prediction type or a prediction size of the CU being encoded. Video encoder 20 is also an example of a video encoder configured to select an intra-prediction mode from available intra-prediction modes, and signal the selected intra-prediction mode based on a most probable intra-prediction mode. In particular, video encoder 20 is an example of a video encoder configured to implement a modified most probable mode selection and signaling process when video encoder 20 identifies plane intra-prediction mode as the most probable mode and plane intra-prediction mode is not available due to, for example, a prediction type and/or prediction size restriction.

FIG. 3 is a block diagram illustrating an example of video decoder 30 for determining available intra-prediction modes for coding a coding unit and decoding an encoded video sequence. In the example of FIG. 3, video decoder 30 includes an entropy decoding unit 70, motion compensation unit 72, intra-prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70. Intra-prediction unit 74 may generate prediction data for a current block of a current frame based on a signaled intra-prediction mode and data from previously decoded blocks of the current frame.

In some examples, entropy decoding unit 70 or inverse quantization unit 76 may scan the received values using a scan mirroring that used by video encoder 20. Accordingly, video decoder 30 may select a scan based on, for example, an indication of an intra-coding mode for a current block, a transform for the current block, a cascaded transform for the current block, or the other factors used by video encoder 20 to select the scan. In this manner, video decoder 30 may produce a two-dimensional matrix of quantized transform coefficients from a received, one dimensional array of coefficients.

Inverse quantization unit 76 inverse quantizes, i.e., de-quantizes, the quantized transform coefficients provided in the bitstream and decoded by entropy decoding unit 70. The inverse quantization process may include a conventional process, e.g., as defined by the H.264 decoding standard or by HEVC. The inverse quantization process may include use of a quantization parameter QP calculated and signaled by video encoder 20 for the CU to determine a degree of quantization and, likewise, a degree of inverse quantization that should be applied.

Inverse transform unit 78 applies an inverse transform, e.g., an inverse DCT, an inverse integer transform, an inverse rotational transform, or an inverse directional transform. In some examples, inverse transform unit 78 may determine an inverse transform based on an intra-prediction mode signaled for a received intra-prediction encoded block. The intra-prediction mode may be signaled, for example, based on the most probable mode, as described with respect to video encoder 20 shown in FIG. 2.

Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 and intra-prediction unit 74 use some of the syntax information (e.g., provided by a quadtree) to determine sizes of LCUs used to encode frame(s) of the encoded video sequence, split information that describes how each CU of a frame of the encoded video sequence is split (and likewise, how sub-CUs are split), modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

According to some aspects of the disclosure, intra-prediction unit 74 may be configured to implement the same intra-mode restrictions as video encoder 20. That is, intra-prediction unit 74 may determine the available intra-prediction modes based on the same prediction type (e.g., which defines a number of prediction units associated with the CU) or prediction size restrictions imposed by video encoder 20. Intra-prediction unit 74 may then use the identified available intra-modes to decode which intra-mode has been used to encode a particular block. That is, for example, video decoder 30 may receive an identification number to identify an intra-prediction mode used by video encoder 20 to encode the video data. Thus, after determining the available intra-prediction modes, intra-prediction unit 74 may use the identification number to decode one of the available intra-prediction modes.

In other examples, intra-prediction unit 74 may receive information, e.g., such as a sequence header or a slice header as a parameter, that signals the availability of intra-modes. Signaling the criteria for determining the set of available intra-modes may allow different sequences or slices of a frame to have different criteria for determining the set of available intra-modes.

According to aspects of the disclosure, intra-prediction unit 74 may be configured to receive and use a most probable mode flag. That is, for example, if intra-prediction unit 74 receives a most probable mode flag having a value of 1, intra-prediction unit 74 may determine that the intra-mode used to encode a current block is the same as certain neighboring blocks. Alternatively, if intra-prediction unit 74 receives a most probable mode flag having a value of 0, intra-prediction unit 74 may determine the intra-mode used to encode a current block by decoding additional bits that identify the intra-mode. According to some examples, intra-prediction unit 74 may maintain a numerical ranking of the intra-modes that is the same as a ranking maintained by video encoder 20, with the most often used intra-modes having the lowest numerical ranking.

Techniques of this disclosure include altering the most probable mode derivation process of decoder 30 if the most probable mode is plane mode, and plane mode is not available for the current block (e.g., due to a prediction type or prediction size restriction). In an example, if intra-prediction unit 74 determines that plane intra-mode is unavailable for a current block, intra-prediction unit 74 may map the intra-prediction mode of neighboring blocks using the plane intra-prediction mode to another intra-mode. In some examples, intra-prediction unit 74 may map the intra-mode of neighboring blocks using the plane intra-mode to DC mode, although any of the other intra-modes may also be used. Intra-prediction unit 74 may then proceed to determine the most probable mode based on the mapped neighbors.

In another example, if intra-prediction unit 74 determines that the most probable mode is plane mode and plane mode is unavailable, intra-prediction unit 74 may instead select a predefined default mode. In one example, video decoder 30 may select DC intra-mode as the predefined default mode, although any of the other intra-modes may also be used.

Summer 80 combines the residual blocks with the corresponding predictive blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

Figure 4:
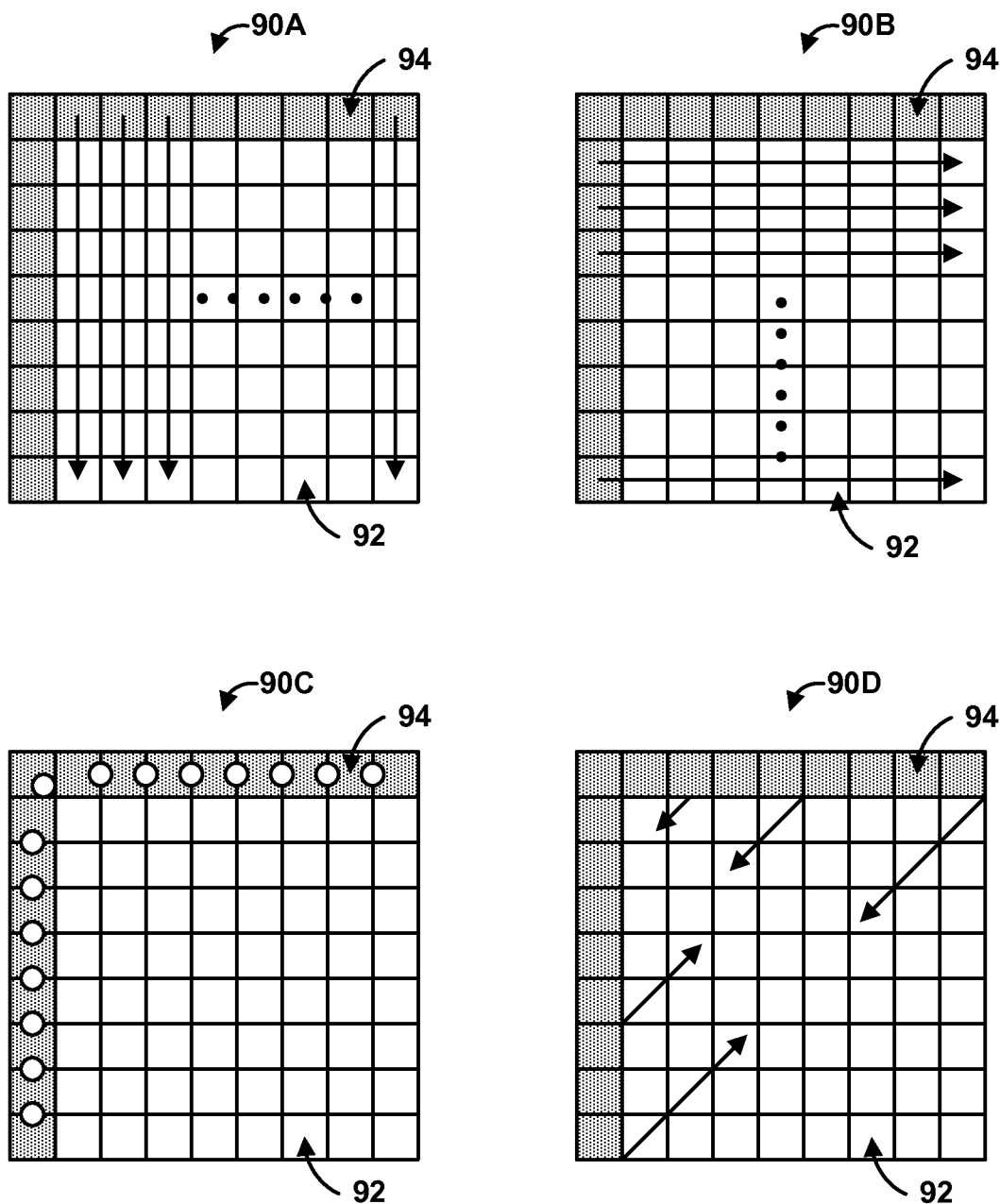
FIG. 4 is a conceptual diagram illustrating a set of intra-prediction modes, according to aspects of the disclosure.

FIG. 4 is a conceptual diagram illustrating intra-prediction modes that may be used for intra-prediction of a block (e.g., a CU) of video data using one or more neighboring pixels of video data. For example, according to some aspects of the disclosure, video encoder 20 and video decoder 30 (FIGS. 1-3) may use the intra-prediction modes shown in FIG. 4 to encode and decode video data. In general, the intra-prediction modes depicted in FIG. 4 are shown for purposes of example only, and represent the four intra-modes available for encoding and decoding macroblocks according to the H.264 specification. Additional intra-prediction modes not shown in FIG. 4 may also be available for encoding to decoding video data. For example, 35 intra-prediction modes are included in the upcoming HEVC standard based on the HM discussed above, which include a variety of directional intra-prediction modes.

Techniques of this disclosure generally relate to determining which intra-modes are available to intra-code a CU of video data, selecting an intra-mode from the available modes, and signaling the selected intra-mode. Thus, it should be understood that the techniques related to determining available intra-prediction modes, selecting an appropriate intra-prediction mode, and signaling the intra-prediction mode described herein may be applied to a variety of intra-modes, including the intra-modes shown in FIG. 4, the directional intra-modes included in the upcoming HEVC standard based on the HM, or any other set of intra-prediction modes, should such modes be available.

FIG. 4 is a conceptual diagram illustrating intra-prediction modes 90A-90D (collectively, intra-prediction modes 90). Intra-prediction modes 90 may not be associated with an angle of prediction. That is, intra-prediction mode 90A corresponds to vertical intra-mode, intra-prediction mode 90B corresponds to horizontal intra-mode, intra-prediction mode 90C corresponds to DC intra-mode, and intra-prediction mode 90D corresponds to plane intra-mode. Although the example shown in FIG. 4 is an 16×16 pixel block, in general, a block may have any number of pixels, e.g., 4×4, 8×8, 16×16, 32×32, 64×64, 128×128, etc.

In general, for intra-prediction mode 90A, predicted pixels (unshaded blocks 92) may be extrapolated from neighboring pixels (shaded blocks 94) positioned above the predicted pixels 92. For example, for intra-prediction mode 90A, predicted pixels 92 of a given column may be assigned the same values as the neighboring pixels 94 positioned above them. For intra-prediction mode 90B, predicted pixels 92 may be extrapolated from neighboring pixels 94 positioned to the left of predicted pixels 92. For example, for intra-prediction mode 90B, predicted pixels 92 of a given row may be assigned the same values as the neighboring pixels 94 positioned to the left of them. For intra-prediction mode 90C, predicted pixels 92 may be derived from an average of neighboring pixels 94 positioned above predicted pixels 92 and neighboring pixels 94 positioned to the left of predicted pixels.

For intra-prediction mode 90D, predicted pixels 92 may be derived from a linear plane function. That is, for plane intra-prediction mode 90D, predicted pixels 92 may be derived using a function that generates a linear plane fitted to the upper and left neighboring pixels. Plane intra-prediction mode 90D may work well in areas of smoothly-varying luminance, however, the error reduction achieved by predicting a relatively small number of pixels using plane intra-mode may be outweighed by the signaling overhead of having plane intra-mode available. For example, unless plane intra-prediction mode 90D has the potential to reduce the prediction error of a block, it may not be worth the signaling overhead associated with signaling the availability of plane intra-prediction mode 90D from an encoder to a decoder.

According to some aspects of the disclosure, a video encoder, such as video encoder 20 (FIGS. 1 and 2), may determine whether intra-modes 90 may are available to intra-encode predicted pixels 92 based on a CU prediction type or a CU prediction size. In particular, video encoder 20 may determine whether plane intra-prediction mode 90D is available based on a CU prediction type or a CU prediction size. For example, according to some aspects of the disclosure, video encoder 20 may make plane intra-prediction mode 90D available when a CU is predicted as a whole (e.g., prediction type 2N×2N), and may make plane intra-prediction mode 90D unavailable when CU is predicted with more than one prediction unit (e.g., prediction type N×N). In another example, video encoder 20 may make plane intra-prediction mode 90D available only when a prediction unit associated with a CU being encoded is larger than a predetermined threshold.

Techniques of this disclosure also include determining whether plane intra-prediction mode 90D is available by video decoder 30. That is, video decoder 30 may determine whether plane intra-prediction mode 90D is available based on a CU prediction type or a CU prediction size. In this way, video decoder 30 may implement the same intra-prediction mode availability determination implemented by video encoder 20, which may be required to determine which intra-prediction mode was used by video encoder 20 to encode a particular block.

Again, in addition to the intra-prediction modes shown in FIG. 4, according to some examples, intra-prediction modes may be associated with a direction, as provided in HM.

Aspects of the disclosure generally relate to determining an available set of intra-prediction modes based on, for example, a prediction type or prediction size restriction. While certain aspects of the disclosure pertain to determining whether a plane mode is available (e.g., intra-prediction mode 90D shown in FIG. 4), it should be understood that techniques of the disclosure can also be applied to determine whether a variety of other intra-modes, such as the directional modes provided in HM, or any other set of intra-prediction modes, are available based on a prediction type or prediction size restriction.

Figure 5A:
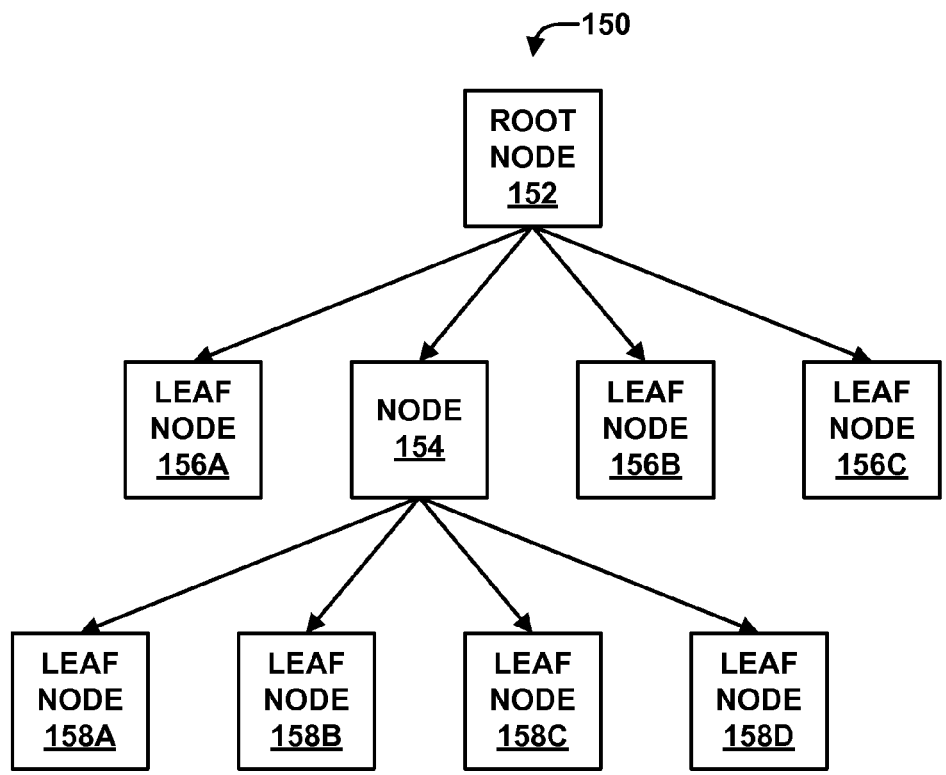
FIG. 5A is a conceptual diagram illustrating an example quadtree structure for a coding unit, according to aspects of the disclosure.
Figure 5B:
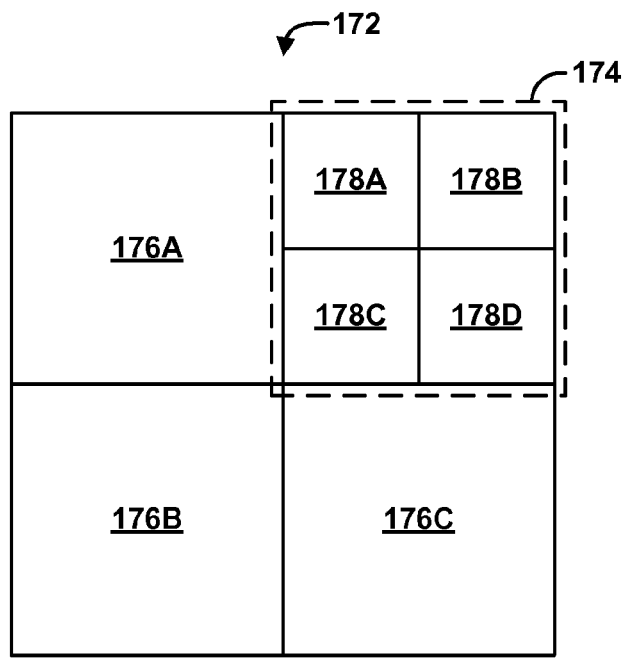
FIG. 5B is a conceptual diagram illustrating an example largest coding unit (LCU), according to aspects of the disclosure.

FIGS. 5A and 5B are conceptual diagrams illustrating an example quadtree 150 and a corresponding largest coding unit 172. FIG. 5A depicts an example quadtree 150, which includes nodes arranged in a hierarchical fashion. Each node in a quadtree, such as quadtree 150, may be a leaf node with no children, or have four child nodes. In the example of FIG. 5A, quadtree 150 includes root node 152. Root node 152 has four child nodes, including leaf nodes 156A-156C (leaf nodes 156) and node 154. Because node 154 is not a leaf node, node 154 includes four child nodes, which in this example, are leaf nodes 158A-158D (leaf nodes 158).

Quadtree 150 may include data describing characteristics of a corresponding largest coding unit (LCU), such as LCU 172 in this example. For example, quadtree 150, by its structure, may describe splitting of the LCU into sub-CUs. Assume that LCU 172 has a size of 2N×2N. LCU 172, in this example, has four sub-CUs 176A-176C (sub-CUs 176) and 174, each of size N×N. Sub-CU 174 is further split into four sub-CUs 178A-178D (sub-CUs 178), each of size N/2×N/2. The structure of quadtree 150 corresponds to the splitting of LCU 172, in this example. That is, root node 152 corresponds to LCU 172, leaf nodes 156 correspond to sub-CUs 176, node 154 corresponds to sub-CU 174, and leaf nodes 158 correspond to sub-CUs 178.

Data for nodes of quadtree 150 may describe whether the CU corresponding to the node is split. If the CU is split, four additional nodes may be present in quadtree 150. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 150, an array of split flag values may be 101000000.

Each of sub-CUs 176 and sub-CUs 178 may be associated with a separate prediction unit (PU). That is, each of sub-CUs 176 and sub-CUs 178 may be intra-prediction encoded according to a prediction unit (PU) associated with each respective sub-CU 176 and sub-CU 178. In general, a PU includes data for retrieving a reference sample for the PU. For example, when the PU is intra-mode encoded, the PU may include data describing an intra-prediction mode for the PU. In addition, as described with respect to FIGS. 6A and 6B, each PU may be further subdivided such that more than one intra-prediction mode is used to intra-prediction encode each sub-CU 176 and sub-CU 178.

Figure 6A:
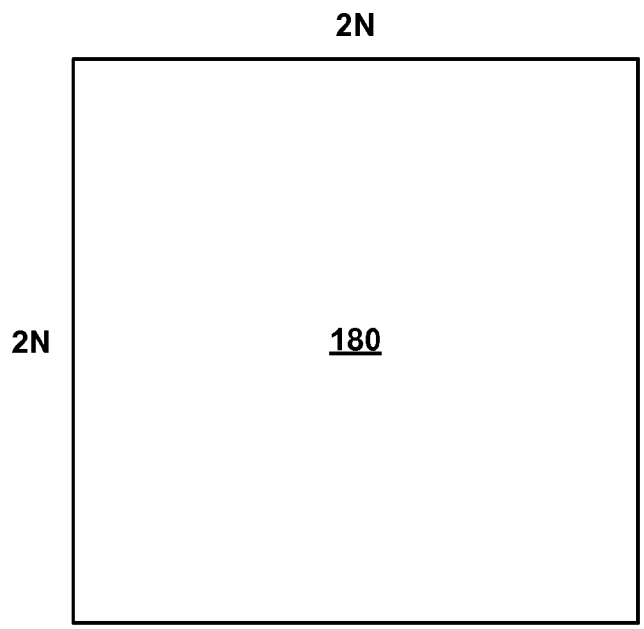
FIG. 6A is a conceptual diagram illustrating an example 2N×2N prediction type for a coding unit, according to aspects of the disclosure.
Figure 6B:
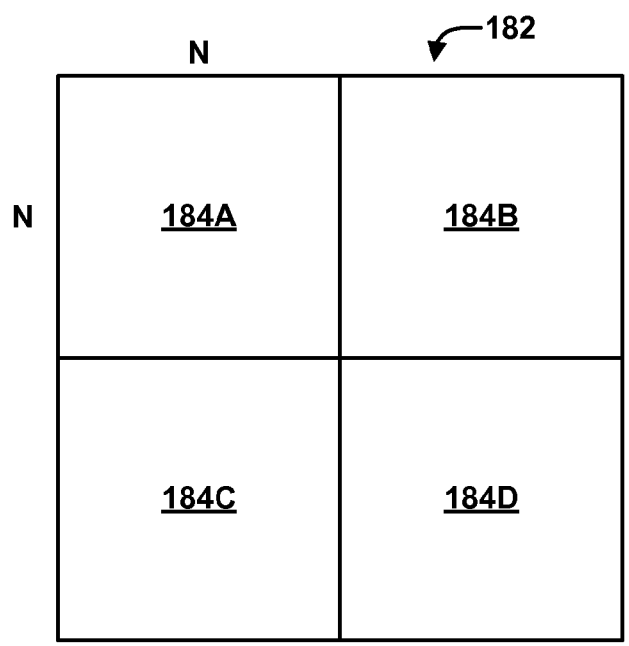
FIG. 6B is a conceptual diagram illustrating an example N×N prediction type for a coding unit, according to aspects of the disclosure.

FIGS. 6A and 6B are conceptual diagrams illustrating example prediction types for predicting a CU using one or more prediction units (PUs). According to aspects of this disclosure, "prediction type" may refer to splitting associated with a prediction unit (PU). In general, for example, a PU used for intra-prediction may be associated with two prediction types, or splitting. That is, a PU may not be split (e.g., 2N×2N), or may be split into quarters (N×N). A PU that is not split may be predicted as a whole, while a PU that is split may have more than one associated prediction mode. In some examples, prediction unit size may be linked with another coding mechanism, such as transform unit size.

For example, FIG. 6A depicts an example 2N×2N prediction type, while FIG. 6B depicts an example N×N prediction type. With respect to FIG. 6A, in general, a 2N×2N prediction type includes data describing an intra-prediction mode 180 for an entire CU. Alternatively, with respect to FIG. 6B, an N×N prediction type is used to predict a CU using more than one intra-prediction mode 184A-184D (collectively, intra-prediction modes 184). That is, an N×N prediction type includes data describing four separate intra-prediction modes 184 for the CU. While FIG. 6B shows the CU being predicted using four equally sized PUs, it should be understood that other divisions are possible.

In accordance with techniques of this disclosure, a video encoder, such as video encoder 20 (FIGS. 1-2) may determine a set of available intra-prediction modes based on a prediction type or a prediction size for a PU. For example, according to some aspects of the disclosure, video encoder 20 may determine a set of available intra-prediction modes based on whether a CU is predicted using a 2N×2N prediction type or using an N×N prediction type. In an example, video encoder 20 may make some modes, such as a plane intra-prediction mode, available if a CU is predicted using a 2N×2N prediction type, but unavailable if the CU is predicted using an N×N prediction type.

Additionally or alternatively, video encoder 20 may determine a set of available intra-prediction modes based on the size of the PUs used to encode a CU. For example, video encoder 20 may make some modes unavailable if a particular PU does not exceed a predetermined size threshold. In an example, video encoder 20 may make a plane intra-prediction mode unavailable if a PU is not greater than 8×8 pixels in size, although other thresholds may be used (e.g., 4×4 pixels, 16×16 pixels, 32×32 pixels, and the like).

Figure 7:
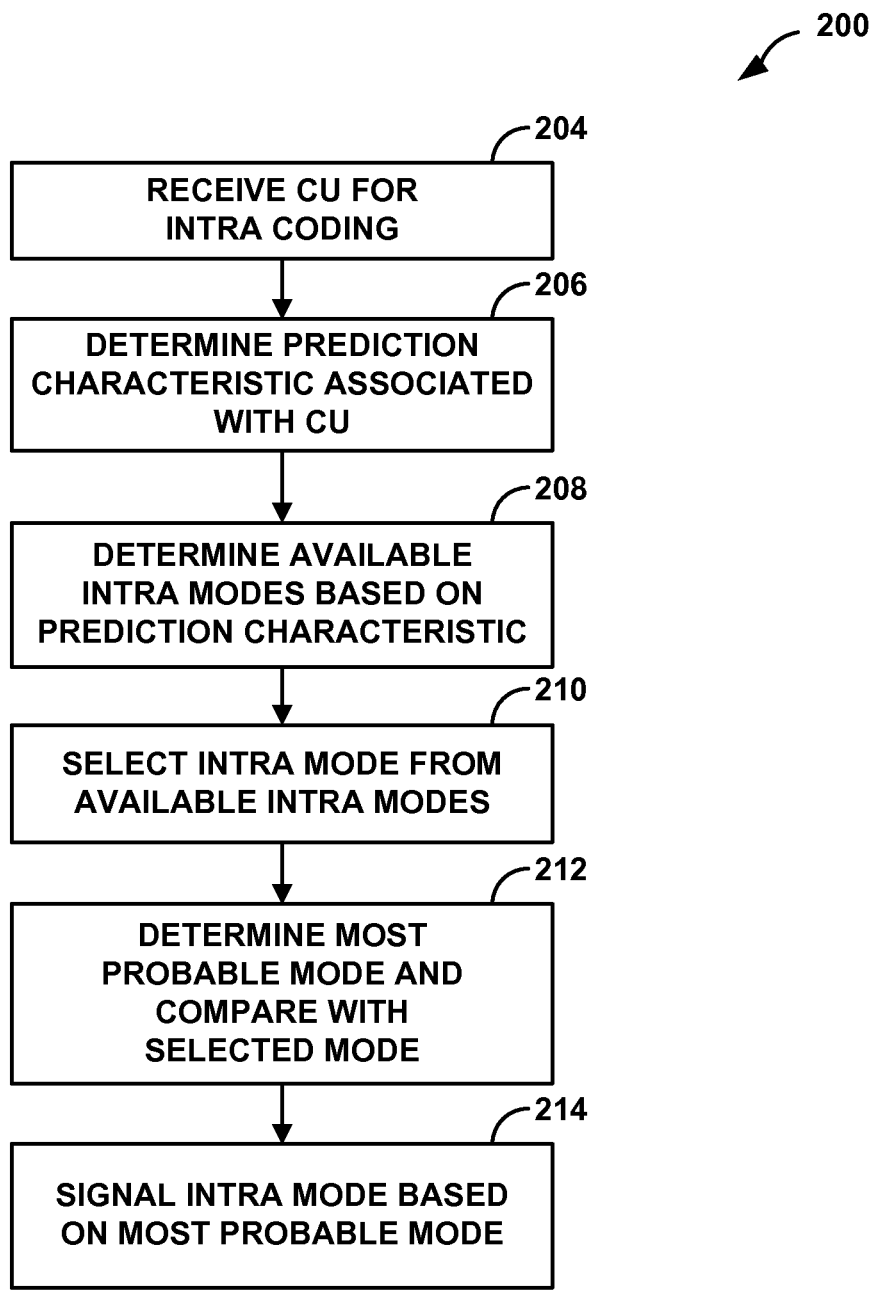
FIG. 7 is a flowchart illustrating an example method for determining available intra-prediction modes for predicting video data, selecting an intra-prediction mode, and signaling the selected intra-prediction mode, according to aspects of the disclosure.

FIG. 7 is a flowchart illustrating an example method 200 for determining available intra-prediction modes for predicting video data, selecting an appropriate intra-mode, and signaling the selected intra-mode. Although generally described as performed by components of video encoder 20 (FIG. 2) for purposes of explanation, it should be understood that other video encoding units, such as video decoder, processors, processing units, hardware-based coding units such as encoder/decoders (CODECs), and the like, may also be configured to perform the method of FIG. 7.

According to the method shown in FIG. 7, video encoder 20 initially receives a CU for intra-coding (204). After receiving a CU for intra-coding, video encoder 20 may determine a prediction characteristic associated with the CU (206). According to techniques of this disclosure, video encoder 20 may determine a prediction type associated with the CU (e.g., a 2N×2N prediction type or an N×N prediction type) and/or determine a prediction size of the CU (e.g., the size of one or more PUs associated with the CU).

After determining a prediction characteristic associated with the CU, video encoder 20 may determine a set of available intra-prediction modes based on the prediction characteristic (208). According to some aspects of the disclosure, intra-mode availability unit 48 may limit the types of intra-prediction modes that are available to intra-predict the CU based the prediction type, e.g., whether the CU is predicted using a 2N×2N prediction type (FIG. 6A), or whether the CU is predicted using an N×N prediction type (FIG. 6B). That is, intra-mode availability unit 48 may determine which of the 35 intra-modes defined in HM may be used to intra-predict the CU based on prediction type. In an example, as described in greater detail with respect to FIG. 8, intra-mode availability unit 48 may make plane intra-prediction mode available for a prediction type of 2N×2N, but unavailable for a prediction type of N×N. If intra-mode availability unit 48 makes plane intra-mode unavailable, intra-prediction unit 46 may not use plane intra-prediction mode when encoding the current CU.

According to some aspects of the disclosure, intra-mode availability unit 48 may limit the types of intra-prediction modes that are available to intra-predict the CU according to the prediction size, e.g., the size of the one or more PUs used to predict the CU. In an example, as described in greater detail with respect to FIG. 9, intra-mode availability unit 48 may make plane intra-prediction mode available for PUs that exceed a predetermined threshold size, but unavailable for PUs that do not exceed the predetermined threshold size. According to one example, intra-mode availability unit 48 may include a threshold size of 8×8 pixels, although other sizes may be used (e.g., 4×4 pixels, 16×16 pixels, 32×32 pixels, and the like).

After determining which intra-prediction modes are available, video encoder 20 may select an intra-prediction mode from the available intra-prediction modes (210). In an example, intra-prediction unit 46 may select an intra-prediction mode based on, e.g., rate-distortion associated with different coding modes.

Video encoder 20 may then determine a most probable mode (212) and signal the selected intra-mode based the most probable mode (214). Video encoder 20 may determine the most probable mode base on an intra-prediction mode used to encode one or more neighboring CUs. In an example, video encoder 20 may determine the most probable mode according to the intra-mode used to predict the CU that is positioned above the current CU and the intra-mode used to predict the CU that is positioned to the left of the current CU, assuming a left-to-right, top-to-bottom encoding order for blocks.

Video encoder 20 may signal the selected intra-mode based on the most probable mode by comparing the selected intra-mode to the most probable mode. In an example, if video encoder 20 determines that the most probable mode is the same as the selected intra-mode for the current CU, video encoder 20 may use a flag (e.g., a one bit most probable mode flag) to indicate that the modes are the same. If video encoder 20 determines that the most probable mode is not the same as the selected intra-mode for the current CU, video encoder 20 may indicate that the modes are not the same and provide an additional indication of the selected intra-mode.

Figure 10:
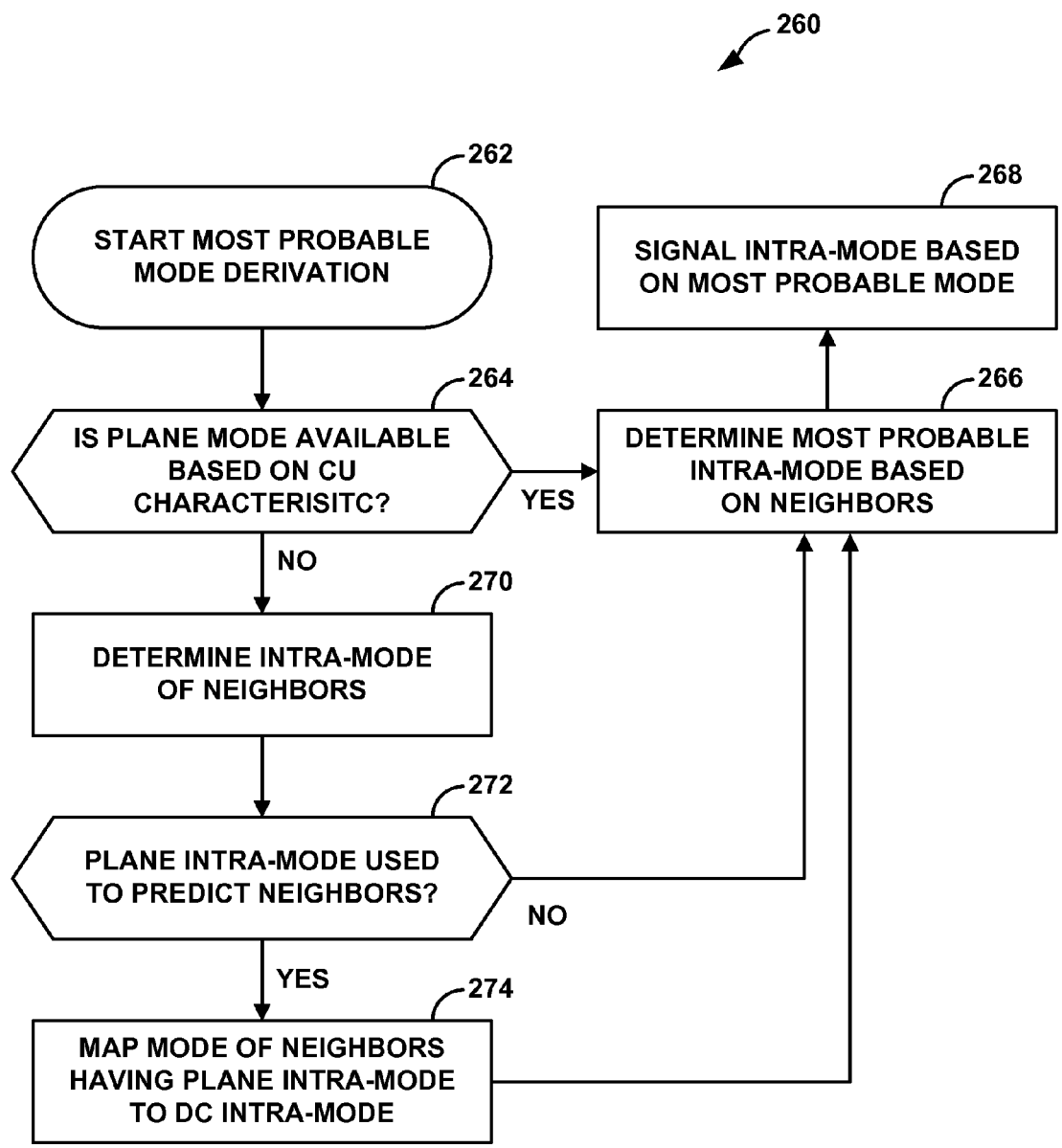
FIG. 10 is a flowchart illustrating an example method for signaling an intra-mode based on a most probable mode, according to aspects of the disclosure.
Figure 11:
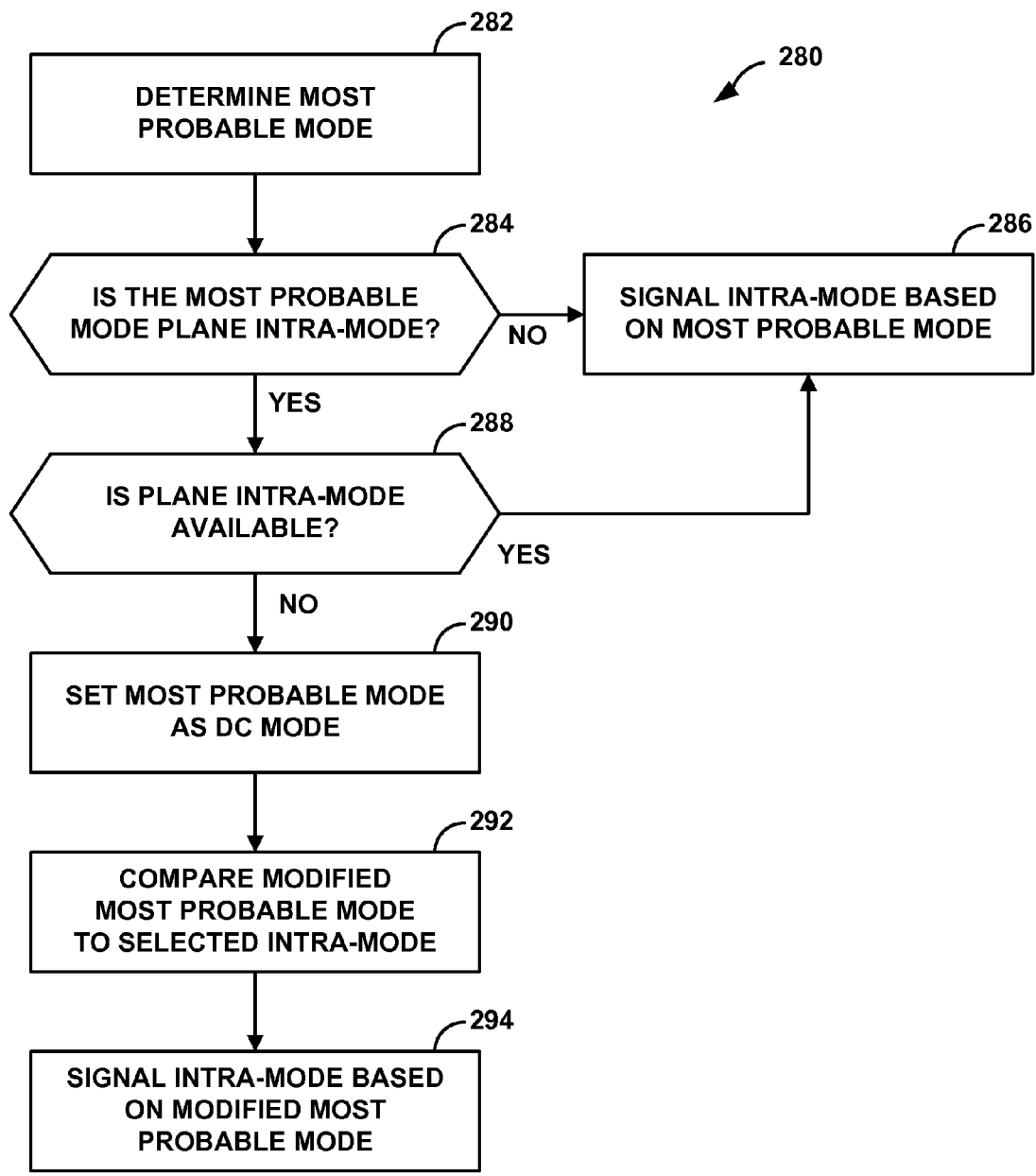
FIG. 11 is a flowchart illustrating another example method for signaling an intra-mode based on a most probable mode, according to aspects of the disclosure.

According to some aspects of the disclosure, as described with respect to FIGS. 10 and 11, video encoder 20 may implement a modified most probable mode determination to account for a situation in which a particular intra-mode is not available for the CU, but the particular intra-mode is the most probable mode. In an example, video encoder 20 may implement a modified most probable mode derivation process if the plane mode is identified as the most probable mode, and the plane mode is not available for the current block.

In this manner, the method of FIG. 7 is an example of a method including determining an available set of intra-prediction modes based on a prediction characteristic of the coding unit (CU) being predicted, selecting an intra-prediction mode from available intra-prediction modes, and signaling the selected intra-prediction mode based on a most probable intra-prediction mode. While the example of FIG. 7 is generally described as being performed by video encoder 20 for purposes of example, it should be understood that a video decoder, such as video decoder 30, may perform a method essentially symmetrical to that of the example shown in FIG. 7 (as shown and described, for example, with respect to FIG. 12). That is, video decoder 30 may perform a method that includes determining an available set of intra-prediction modes based on a prediction characteristic of the coding unit (CU) being predicted, decoding an intra-prediction mode from available intra-prediction modes based on a most probable intra-prediction mode, and selecting the decoded intra-prediction mode to decode the CU.

It should also be understood that the steps shown and described with respect to FIG. 7 are provided as merely one example. That is, the steps of the method of FIG. 7 need not necessarily be performed in the order shown in FIG. 7, and fewer, additional, or alternative steps may be performed. According to another example, video encoder 20 may determine available intra-prediction modes based on a prediction characteristic, but may not signal the intra-prediction mode based on the most probable mode. According to another example, video encoder 20 may determine a most probable mode (212) prior to determining available modes (208) and selecting an available mode (210).

Figure 8:
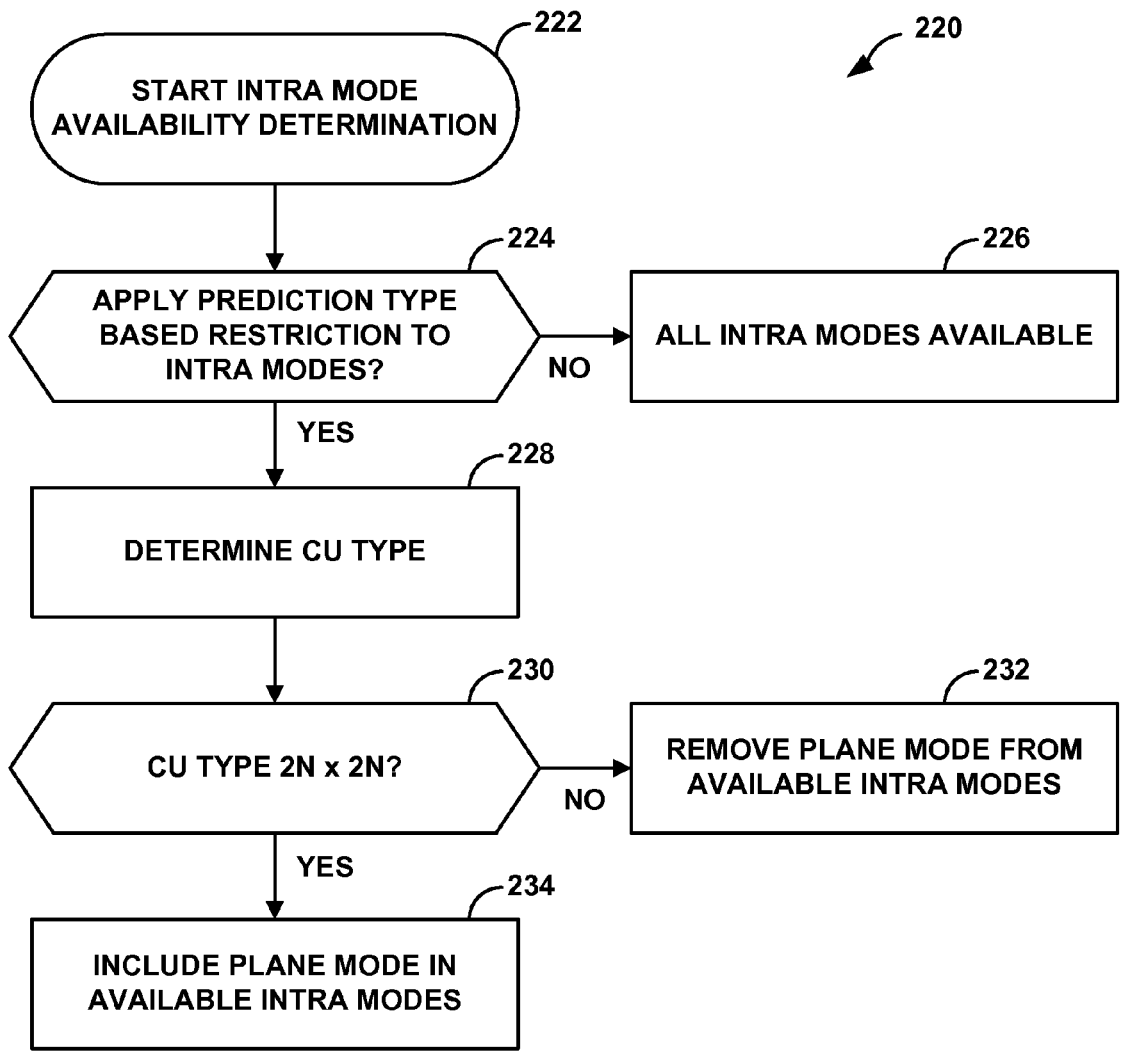
FIG. 8 is a flowchart illustrating an example method for determining available intra-prediction modes based on a coding unit prediction type restriction, according to aspects of the disclosure.

FIG. 8 is a flowchart illustrating an example method 220 for determining available intra-prediction modes based on a CU prediction type restriction. In particular, the method 220 shown in FIG. 8 illustrates an example method for determining whether to include plane intra-prediction mode in a set of available intra-prediction modes based on a CU prediction type restriction. Although generally described as performed by components of video encoder 20 (FIG. 2) for purposes of explanation, it should be understood that video decoder and other video coding units, such as processors, processing units, hardware-based coding units such as encoder/decoders (CO-DECs), and the like, may also be configured to perform the method of FIG. 8.

Video encoder initially begins the intra-prediction mode availability determination (222) by determining whether to apply a prediction type based restriction to a set of intra-prediction modes (224). For example, video encoder 20 may be configured to have a certain number of available intra-prediction modes. In HM, video encoder 20 may be configured to have 35 intra-modes available for intra-prediction purposes. In accordance with techniques of this disclosure, video encoder 20 may also be configured to apply a prediction type based restriction to limit the number of intra-prediction modes available.

If video encoder 20 does not apply a prediction type based restriction for determining a set of available intra-prediction modes, video encoder 20 may use any available intra-mode for encoding the CU (e.g., all 35 intra-modes specified in HM) (226). If video encoder 20 does apply a prediction type restriction to determine a set of available intra-prediction modes, video encoder 20 may determine the prediction type associated with the CU (228). In the example method shown in FIG. 8, video encoder 20 determines whether the CU is predicted as a whole (e.g., a 2N×2N type), or is predicted using more than one prediction unit (e.g. an N×N type) (230). According to some aspects of the disclosure, if video encoder 20 determines that the prediction type of the CU is not 2N×2N, video encoder 20 may make a plane intra-prediction mode unavailable (232). That is, video encoder 20 may remove the plane intra-mode from consideration, such that the CU may not be intra-predicted using plane intra-prediction mode. If the CU prediction type is 2N×2N, video encoder 20 may include plane intra-prediction mode with other available intra-modes (234).

In this manner, the method shown in FIG. 8 is an example method including determining whether to include plane intra-prediction mode in a set of available intra-prediction modes based on a CU prediction type. While the example of FIG. 8 is generally described as being performed by video encoder 20 for purposes of example, it should be understood that a video decoder, such as video decoder 30, may perform a method essentially symmetrical to that of the example shown in FIG. 8. That is, video decoder 30 may perform a method that includes determining whether to include plane intra-prediction mode in a set of available intra-prediction modes based on a CU prediction type.

It should also be understood that the steps shown and described with respect to FIG. 8 are provided as merely one example. For example, while FIG. 8 is related to determining whether a plane intra-prediction mode is available based on a prediction type of a CU, it should be understood that the techniques of the disclosure related to determining the availability of an intra-mode may also be applied to other intra-prediction modes. Moreover, the steps of the method of FIG. 8 need not necessarily be performed in the order shown in FIG. 8, and fewer, additional, or alternative steps may be performed.

Figure 9:
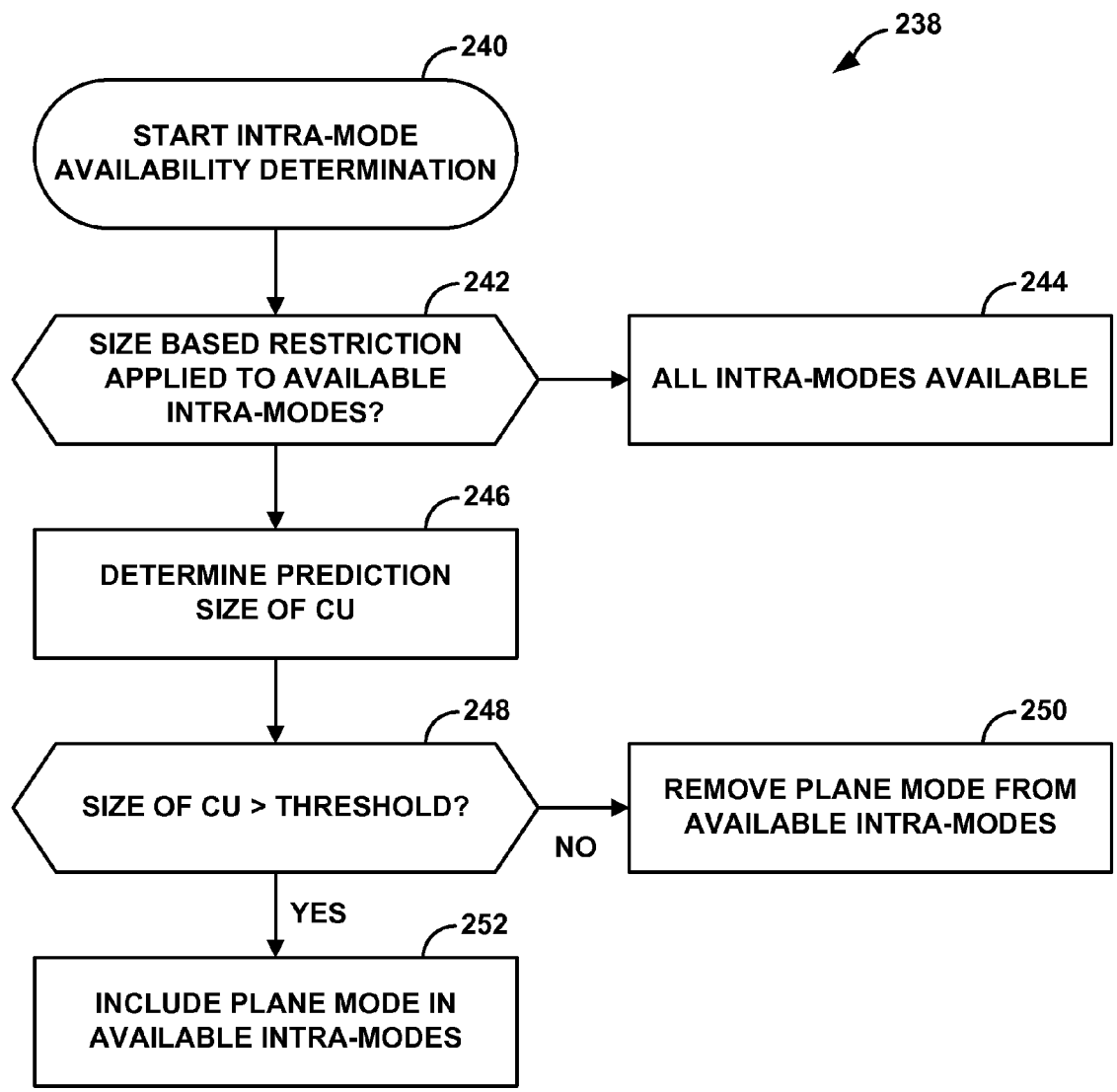
FIG. 9 is a flowchart illustrating an example method for determining available intra-prediction modes based on a coding unit prediction size restriction, according to aspects of the disclosure.

FIG. 9 is a flowchart illustrating an example method 238 for determining available intra-prediction modes based on a CU prediction size restriction. In particular, the method 238 shown in FIG. 9 illustrates an example method for determining whether to include plane intra-prediction mode in a set of available intra-prediction modes based on a CU prediction size (e.g., size of the one or more PUs used to predict the CU) restriction. Although generally described as performed by components of video encoder 20 (FIG. 2) for purposes of explanation, it should be understood that video decoder and other video coding units, such as processors, processing units, hardware-based coding units such as encoder/decoders (CO-DECs), and the like, may also be configured to perform the method of FIG. 9.

Video encoder 20 initially begins the intra-prediction mode availability determination (240) by determining whether to apply a CU prediction size based restriction to a set of available intra-prediction modes (242). For example, as described above with respect to FIG. 8, video encoder 20 may be configured to have a certain number of available intra-prediction modes. In HM, video encoder 20 may be configured to have 35 intra-modes available for intra-prediction purposes. In accordance with techniques of this disclosure, video encoder 20 may also be configured to apply a prediction size-based restriction to limit the number of intra-prediction modes available.

If video encoder 20 does not apply a prediction size based restriction for determining a set of available intra-prediction modes (242), video encoder 20 may use any available intra-mode for encoding the CU (e.g., all 35 intra-modes specified in HM) (244). If video encoder 20 does apply a prediction size restriction to determine a set of available intra-prediction modes (242), video encoder 20 may determine the size of the PUs associated with the CU (246).

In the example method shown in FIG. 9, video encoder 20 compares the CU prediction size, e.g., the size of the one or more PUs associated with the CU, to a predetermined threshold (248). In an example, the threshold may be 8×8 pixels, although other thresholds may be used (e.g., 4×4 pixels, 16×16 pixels, 32×32 pixels, and the like). According to some aspects of the disclosure, if video encoder 20 determines that the prediction size of the CU is not greater than the threshold size (248), video encoder 20 may make a plane intra-prediction mode unavailable (250). That is, video encoder 20 may remove the plane intra-mode from consideration, such that the CU may not be intra-predicted using plane intra-prediction mode. If video encoder 20 determines that the prediction size of the CU is greater than the threshold size (248), video encoder 20 may include plane intra-prediction mode with other available intra-modes (252).

In this manner, the method shown in FIG. 9 is an example method including determining whether to include plane intra-prediction mode in a set of available intra-prediction modes based on a CU prediction size (e.g., size of the one or more PUs used to predict the CU). While the example of FIG. 9 is generally described as being performed by video encoder 20 for purposes of example, it should be understood that a video decoder, such as video decoder 30, may perform a method essentially symmetrical to that of the example shown in FIG. 9. That is, video decoder 30 may perform a method that includes determining whether to include plane intra-prediction mode in a set of available intra-prediction modes based on a CU prediction size (e.g., size of the one or more PUs used to predict the CU).

It should also be understood that the steps shown and described with respect to FIG. 9 are provided as merely one example. For example, while FIG. 9 is related to determining whether a plane intra-prediction mode is available based on a CU prediction size, it should be understood that the techniques of the disclosure related to determining the availability of an intra-mode may also be applied to other intra-prediction modes. Moreover, the steps of the method of FIG. 9 need not necessarily be performed in the order shown in FIG. 9, and fewer, additional, or alternative steps may be performed.

FIG. 10 is a flowchart illustrating an example method 260 for signaling an intra-mode based on a most probable mode. In particular, FIG. 10 illustrates an example method 260 for signaling an intra-prediction mode based on a most probable mode when plane mode is the most probable mode, but plane mode is not available for the current CU. Although generally described as performed by components of video encoder 20 (FIG. 2) for purposes of explanation, it should be understood that video decoder and other video coding units, such as processors, processing units, hardware-based coding units such as encoder/decoders (CODECs), and the like, may also be configured to perform the method of FIG. 10.

Video encoder 20 initially begins the most probable mode derivation (262) by determining whether a plane intra-prediction mode is available (264). According to some aspects of the disclosure, a plane intra-prediction mode may not be available to intra-encode a CU due to, for example, a prediction type restriction (e.g., as described with respect to FIG. 8) or a prediction size restriction (e.g., as described with respect to FIG. 9). If plane intra-mode is available, video encoder 20 may continue determining a most probable intra-prediction mode based on one or more neighboring CUs (266). For example, video encoder 20 may determine a most probable mode based on previously coded CUs that are positioned above and to the left of the current CU, although other reference CUs may be used. Again, previously coded CUs that are in relatively close proximity of the current CU may have a high probability of having the same intra-mode as the current CU.

Video encoder 20 may also signal the selected intra-mode based on the most probable mode (268). That is, for example, video encoder 20 may set a most probable mode flag based on a comparison of the most probable mode and the selected intra-mode used to encode a current block. If the most probable mode is the same as the selected intra-mode for the current block, video encoder 20 may set the most probable mode flag to a value of 1, indicating that the modes are the same. If the most probable mode is not the same as the selected intra-mode for the current block, video encoder 20 may set the most probable mode flag to a value of 0 and send additional information to identify the appropriate selected intra-mode.

If the plane intra-mode is not available (264), video encoder 20 may determine the intra-mode of the neighboring CUs that are used for determining the most probable mode (270). Video encoder 20 may then determine whether plane intra-mode is used to predict the neighboring CUs (272). If plane intra-mode is not used to predict the neighboring CUs (272), video encoder 20 can continue determining the most probable mode (266) and signaling a selected intra-mode based on the most probable mode (268).

If plane intra-mode is used to predict one or more of the neighboring CUs (274), but plane intra-mode is not available for the current CU, according to aspects of the disclosure, video encoder 20 may implement a modified most probable mode derivation process. In the example shown in FIG. 10, video encoder 20 may map the mode of any neighbors that were predicted using plane intra-mode to another mode, such as DC intra-mode, although other intra-modes may be used (274). With the mapped neighbors, video encoder 20 may continue determining the most probable intra mode (266) and signaling the selected mode of the current CU based on the most probable mode (268).

In this manner, the method shown in FIG. 10 is an example method including signaling an intra-prediction mode based on a most probable mode when a plane mode is the most probable mode, but plane mode is not available for the current CU. While the example of FIG. 10 is generally described as being performed by video encoder 20 for purposes of example, it should be understood that a video decoder, such as video decoder 30, may perform a method essentially symmetrical to that of the example shown in FIG. 10. That is, video decoder 30 may perform a method that includes decoding and identifying an intra-prediction mode based on a most probable mode when a plane mode is the most probable mode, but plane mode is not available for the current CU.

It should also be understood that the steps shown and described with respect to FIG. 10 are provided as merely one example. For example, while FIG. 10 is generally related to a modified most probable mode derivation and signaling process when plane intra-mode is not available, it should be understood that the techniques of the disclosure related to implementing a modified most probable mode process may also be applied to other intra-prediction modes. Moreover, the steps of the method of FIG. 10 need not necessarily be performed in the order shown in FIG. 10, and fewer, additional, or alternative steps may be performed.

FIG. 11 is a flowchart illustrating an example method 280 for signaling an intra-mode based on a most probable mode. In particular, FIG. 11 illustrates an example method 280 for signaling an intra-prediction mode based on a most probable mode when a plane mode is the most probable mode, but plane mode is not available for the current CU. Although generally described as performed by components of video encoder 20 (FIG. 2) for purposes of explanation, it should be understood that video decoder and other video encoding units, such as processors, processing units, hardware-based coding units such as encoder/decoders (CODECs), and the like, may also be configured to perform the method of FIG. 11.

Video encoder 20 initially begins by determining a most probable intra-prediction mode based on, for example, one or more neighboring CUs (282). As described with respect to FIG. 11, video encoder 20 may determine a most probable mode based on previously coded CUs that are positioned above and to the left of the current CU, although other reference CUs may be used.

Video encoder 20 may then determine whether the most probable mode is a plane intra-mode (284). If plane intra-mode is not the most probable mode, video encoder 20 may continue by signaling the selected intra-mode based on the most probable mode (286). For example, as described with respect to FIG. 11, video encoder 20 may set a most probable mode flag based on a comparison of the most probable mode and the selected intra-mode used to encode a current block.

If the most probable mode is plane intra-mode, video encoder 20 may determine whether plane intra-mode is available for the current CU (288). That is, video encoder 20 may determine whether plane intra-mode has been made unavailable due to, for example, a prediction type or prediction size restriction. If plane intra-mode is available (288), video encoder 20 may continue by signaling the selected intra-mode based on the most probable mode (286). If plane intra-mode is the most probable mode (290), but plane intra-mode is not available, video encoder 20 may set the most probable mode as another intra-mode, such as DC mode (290). Video encoder 20 may then compare the modified most probable mode with the selected intra-mode (292) and signal the selected intra-mode based on the modified most probable mode (294).

In this manner, the method shown in FIG. 11 is an example method including signaling an intra-prediction mode based on a most probable mode when a plane mode is the most probable mode, but plane mode is not available for the current CU. While the example of FIG. 11 is generally described as being performed by video encoder 20 for purposes of example, it should be understood that a video decoder, such as video decoder 30, may perform a method essentially symmetrical to that of the example shown in FIG. 11. That is, video decoder 30 may perform a method that includes decoding and identifying an intra-prediction mode based on a most probable mode when a plane mode is the most probable mode, but plane mode is not available for the current CU.

It should also be understood that the steps shown and described with respect to FIG. 11 are provided as merely one example. For example, while FIG. 11 is generally related to a modified most probable mode derivation and signaling process when plane intra-mode is not available, it should be understood that the techniques of the disclosure related to implementing a modified most probable mode process may also be applied to other intra-prediction modes. Moreover, the steps of the method of FIG. 11 need not necessarily be performed in the order shown in FIG. 11, and fewer, additional, or alternative steps may be performed.

Figure 12:
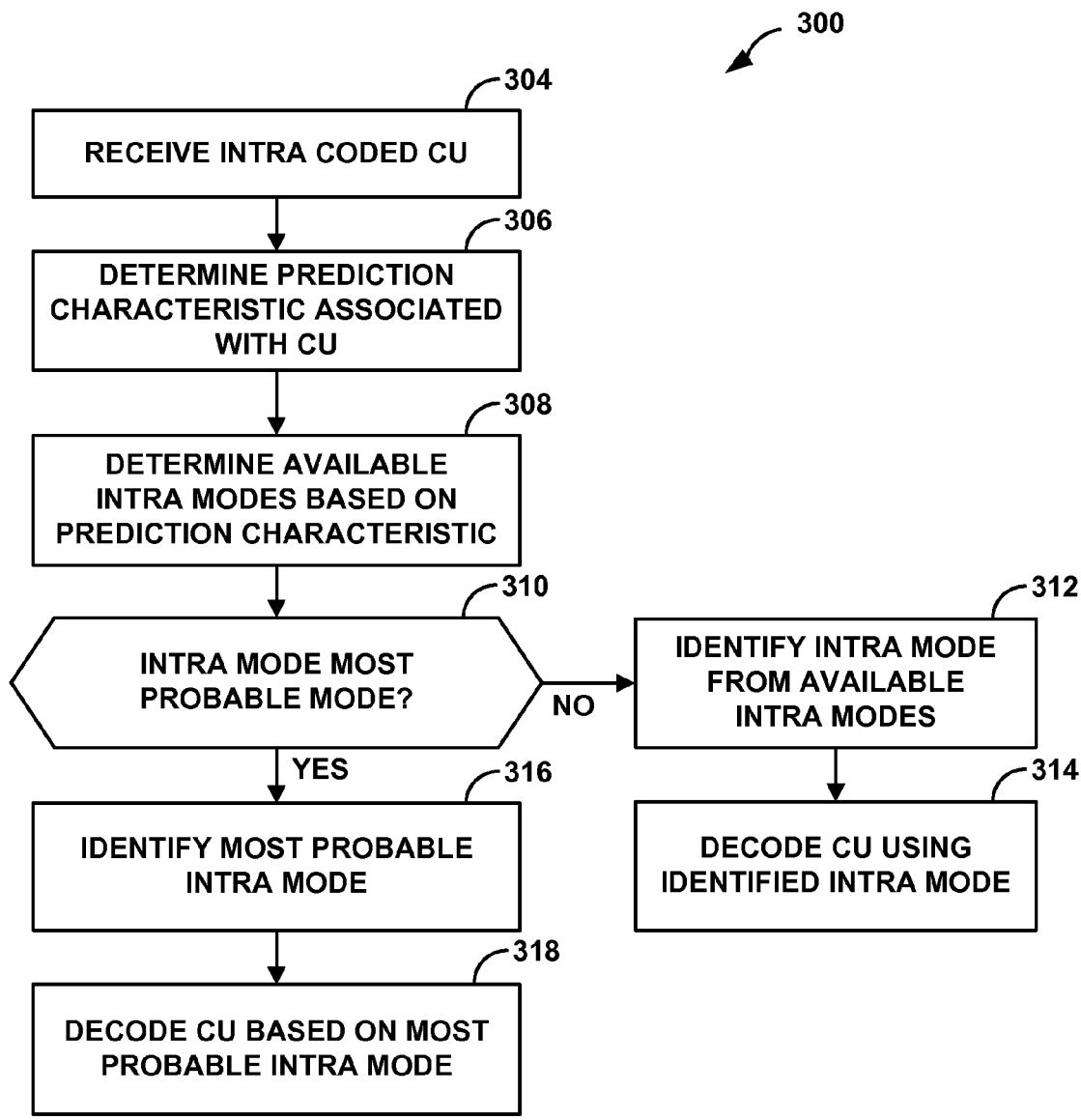
FIG. 12 is a flowchart illustrating an example method for determining available intra-prediction modes for predicting video data, decoding an intra-mode from available intra-prediction modes, and decoding the video data using the decoded intra-mode, according to aspects of the disclosure.

FIG. 12 is a flowchart illustrating an example method 300 for determining available intra-prediction modes for predicting video data, decoding an intra-mode from available intra-prediction modes, and decoding the video data using the decoded intra-mode, according to aspects of the disclosure. Although generally described as performed by components of video decoder 30 (FIG. 3) for purposes of explanation, it should be understood that other video coding units, such as processors, processing units, hardware-based coding units such as encoder/decoders (CODECs), and the like, may also be configured to perform the method of FIG. 12.

According to the method shown in FIG. 12, video decoder 30 initially receives an intra-coded CU (304). After receiving the CU, video decoder 30 may determine a prediction characteristic associated with the CU (306). According to techniques of this disclosure, video decoder 30 may determine a prediction type associated with the CU (e.g., a 2N×2N prediction type or an N×N prediction type) and/or determine a prediction size of the CU (e.g., the size of one or more PUs associated with the CU).

After determining a prediction characteristic associated with the CU, video decoder 30 may determine a set of available intra-prediction modes based on the prediction characteristic (308). For example, video decoder 30 may identify the available intra-prediction modes, as determined by video encoder 20, for decoding the CU. According to some aspects of the disclosure, video decoder 30 may determine that one or more intra-prediction modes (e.g., of the 35 intra-prediction modes defined in HM) are unavailable due to a prediction type or prediction size restriction.

In an example, video decoder 30 may determine that a plane mode is unavailable due to a prediction type restriction, e.g., whether the CU is predicted using a 2N×2N prediction type (FIG. 6A), or whether the CU is predicted using an N×N prediction type (FIG. 6B). In some examples, video decoder 30 may implement a method reciprocal to the method shown and described with respect to FIG. 8. That is, video decoder 30 may determine that plane intra-prediction mode is available for a prediction type of 2N×2N, but unavailable for a prediction type of N×N.

In another example, video decoder 30 may determine that a plane intra-mode is unavailable due to a CU prediction size restriction, e.g., the size of the one or more PUs used to predict the CU. In some examples, video decoder 30 may implement a method reciprocal to the method shown and described with respect to FIG. 9. That is, video decoder 30 may determine that plane intra-prediction mode is available for PUs that exceed a predetermined threshold size, but is unavailable for PUs that do not exceed the predetermined threshold size. According to one example, the threshold size may be 8×8 pixels, although other sizes may be used (e.g., 4×4 pixels, 16×16 pixels, 32×32 pixels, and the like).

After determining which intra-prediction modes are available, video decoder 30 may determine whether a most probable mode was used to encode the current CU (310). For example, video decoder 30 may determine whether a most probable mode was used to encode the current CU based on a received most_probable_mode flag (e.g., a value of 1 indicating the most probable mode was used, a value of 0 indicating that the most probable mode was not used).

If the most probable mode was not used to encode the current CU, video decoder 30 may decode additional data to identify which intra-mode was used to encode the current CU from the available intra-modes (312). That is, video decoder 30 may identify the available intra-prediction modes used by video encoder 20 to encode the CU, and decode one of the available intra-prediction modes to decode the CU. According to some examples, video decoder 30 may decode one of the available intra-modes using a identifier assigned to the intra-mode by the video encoder 20, as well as a identified list of available intra-modes. Video decoder 30 can then decode the current CU using the decoded intra-mode (314).

If the most probable mode was used to encode the current CU, video decoder 30 may identify the most probable mode using a process reciprocal to video encoder 20 (316). That is, video decoder 30 may determine the most probable mode base on an intra-prediction mode used to encode one or more neighboring CUs. In an example, video decoder 30 may determine the most probable mode according to the intra-mode used to predict the CU that is positioned above the current CU and the intra-mode used to predict the CU that is positioned to the left of the current CU, assuming a left-to-right, top-to-bottom encoding order for blocks.

According to some aspects of the disclosure, video decoder 30 may use a process similar to the method shown and described with respect to FIGS. 10 and 11 to determine a most probable mode. That is, video decoder 30 may implement a modified most probable mode determination to account for a situation in which a particular intra-mode is unavailable for the current CU, but the particular intra-mode is the most probable mode. In an example, video decoder 30 may implement a modified most probable mode derivation process if the plane intra-mode is identified as the most probable mode, and the plane intra-mode is not available for the current block.

After identifying the most probable mode (316), video decoder 30 may decode the current CU using the most probable mode (318). In this manner, the method of FIG. 12 is an example of a method including determining available intra-prediction modes for predicting video data, decoding an intra-mode from the determined available intra-prediction modes, and decoding the video data using the decoded intra-mode.

It should be understood that the steps shown and described with respect to FIG. 12 are provided as merely one example. That is, the steps of the method of FIG. 12 need not necessarily be performed in the order shown in FIG. 12, and fewer, additional, or alternative steps may be performed.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for coding video data, the method comprising:
   determining, for a coding unit of video data, a prediction type that defines a number of prediction units associated with the coding unit and whether the coding unit is predicted as a whole;
   generating a set of available intra-prediction modes for the coding unit based on the prediction type, wherein generating the set of intra-prediction modes comprises making at least one intra-prediction mode unavailable in the set of available intra-prediction modes when the coding unit is not predicted as a whole;
   selecting an intra-prediction mode from the available intra-prediction modes; and
   applying the selected intra-prediction mode to code the coding unit.

2. The method of claim 1, wherein applying one of the available intra-prediction modes to code the coding unit comprises applying one of the available intra-prediction modes to decode the coding unit.

3. The method of claim 1, wherein applying one of the available intra-prediction modes to code the coding unit comprises applying one of the available intra-prediction modes to encode the coding unit.

4. The method of claim 1, wherein determining whether the coding unit is predicted as a whole comprises determining whether the coding unit is predicted as a 2N×2N type with a single prediction unit.

5. The method of claim 4, wherein generating the set of intra-prediction modes comprises including a plane intra-prediction mode in the set of available intra-prediction modes when the coding unit is predicted as a 2N×2N type.

6. The method of claim 1, wherein determining the prediction type includes determining whether the coding unit is predicted as an N×N type with four prediction units.

7. The method of claim 6, wherein generating the set of intra-prediction modes comprises making a plane intra-prediction mode unavailable in the set of available intra-prediction modes when the coding unit is predicted as an N×N type.

8. The method of claim 1, wherein selecting the intra-prediction mode from the available intra-prediction modes comprises determining a most probable mode based on an intra-prediction mode of at least one neighboring coding unit, and wherein, when the set of available intra-prediction modes does not include a plane intra-prediction mode and the plane intra-prediction mode is determined to be the most probable mode, mapping the at least one neighboring coding unit to a different intra-prediction mode and determining the most probable mode based on the at least one mapped neighboring coding unit.

9. The method of claim 1, wherein selecting the intra-prediction mode from the available intra-prediction modes comprises determining a most probable mode based on an intra-prediction mode of at least one neighboring coding unit, and wherein, when the set of available intra-prediction modes does not include a plane intra-prediction mode and the plane intra-prediction mode is determined to be the most probable mode, determining the most probable mode comprises selecting another predefined intra-prediction mode instead of plane mode.

10. An apparatus for coding video data, the apparatus comprising one or more processors configured to:
determine, for a coding unit of video data, a prediction type that defines a number of prediction units associated with the coding unit and whether the coding unit is predicted as a whole;
generate a set of available intra-prediction modes for the coding unit based on the prediction type, wherein to generate the set of available intra-prediction modes, the one or more processors are configured to make at least one intra-prediction mode unavailable in the set of available intra-prediction modes when the coding unit is not predicted as a whole;
select an intra-prediction mode from the available intra-prediction modes; and
apply the selected intra-prediction mode to code the coding unit.

11. The apparatus of claim 10, wherein the one or more processors are a component of a video decoding device.

12. The apparatus of claim 10, wherein the one or more processors are a component of a video encoding device.

13. The apparatus of claim 10, wherein the processor is configured to determine whether the coding unit is predicted as a whole by determining whether the coding unit is predicted as a 2N×2N type with a single prediction unit.

14. The apparatus of claim 13, wherein the processor is configured to generate the set of intra-prediction modes by including a plane intra-prediction mode in the set of available intra-prediction modes when the coding unit is predicted as a 2N×2N type.

15. The apparatus of claim 10, wherein the processor is configured to determine the prediction type by determining whether the coding unit is predicted as an N×N type with four prediction units.

16. The apparatus of claim 15, wherein generating the set of intra-prediction modes comprises making a plane intra-prediction mode unavailable in the set of available intra-prediction modes when the coding unit is predicted as an N×N type.

17. An apparatus for coding video data, the apparatus comprising:
a means for determining, for a coding unit of video data, a prediction type that defines a number of prediction units associated with the coding unit and for determining whether the coding unit is predicted as a whole;
a means for generating a set of available intra-prediction modes for the coding unit based on the prediction type, wherein the means for generating the set of intra-prediction modes comprises means for making at least one intra-prediction mode unavailable in the set of available intra-prediction modes when the coding unit is not predicted as a whole;
a means for selecting an intra-prediction mode from the available intra-prediction modes; and
a means for applying the selected intra-prediction mode to code the coding unit.

18. The apparatus of claim 17, wherein the apparatus comprises a video decoding device.

19. The apparatus of claim 17, wherein the apparatus comprises a video encoding device.

20. The apparatus of claim 17, wherein the means for determining whether the coding unit is predicted as a whole comprises means for determining whether the coding unit is predicted as a 2N×2N type with a single prediction unit.

21. The apparatus of claim 20, wherein generating the set of intra-prediction modes comprises including a plane intra-prediction mode in the set of available intra-prediction modes when the coding unit is predicted as a 2N×2N type.

22. The apparatus of claim 17, wherein determining the prediction type includes determining whether the coding unit is predicted as an N×N type with four prediction units.

23. The apparatus of claim 22, wherein generating the set of intra-prediction modes comprises making a plane intra-prediction mode unavailable in the set of available intra-prediction modes when the coding unit is predicted as an N×N type.

24. The apparatus of claim 17, wherein the means for selecting the intra-prediction mode from the available intra-prediction modes comprises means for determining a most probable mode based on an intra-prediction mode of at least one neighboring coding unit, and wherein, when the set of available intra-prediction modes does not include a plane intra-prediction mode and the plane intra-prediction mode is determined to be the most probable mode, mapping the at least one neighboring coding unit to a different intra-prediction mode and determining the most probable mode based on the at least one mapped neighboring coding unit.

25. The apparatus of claim 17, wherein the means for selecting the intra-prediction mode from the available intra-prediction modes comprises determining a most probable mode based on an intra-prediction mode of at least one neighboring coding unit, and wherein, when the set of available intra-prediction modes does not include a plane intra-prediction mode and the plane intra-prediction mode is determined to be the most probable mode, determining the most probable mode comprises selecting another predefined intra-prediction mode instead of plane mode.

26. A computer program product comprising a non-transitory computer-readable storage medium having stored thereon instructions that, when executed, cause a processor of a device for coding video data to:
determine, for a coding unit of video data, a prediction type that defines a number of prediction units associated with the coding unit and whether the coding unit is predicted as a whole;

generate a set of available intra-prediction modes for the coding unit based on the prediction type, wherein to generate the set of available intra-prediction modes, the one or more processors are configured to make at least one intra-prediction mode unavailable in the set of available intra-prediction modes when the coding unit is not predicted as a whole;

select an intra-prediction mode from the available intra-prediction modes; and apply the selected intra-prediction mode to code the coding unit.

27. The computer program product of claim 26, wherein to determine whether the coding unit is predicted as a whole, the instructions cause the processor to determine whether the coding unit is predicted as a 2N×2N type with a single prediction unit.

28. The computer program product of claim 27, further comprising instructions that cause the processor to include a plane intra-prediction mode in the set of available intra-prediction modes when the coding unit is predicted as a 2N×2N type.

29. The computer program product of claim 26, further comprising instructions that cause the processor to determine whether the coding unit is predicted as an N×N type with four prediction units.

30. The computer program product of claim 29, further comprising instructions that cause the processor to make a plane intra-prediction mode unavailable in the set of available intra-prediction modes when the coding unit is predicted as an N×N type.

31. The computer program product of claim 26, wherein to select the intra-prediction mode from the available intra-prediction modes, the instructions cause the processor to determine a most probable mode based on an intra-prediction mode of at least one neighboring coding unit, and further comprising instructions that cause the processor to, when the set of available intra-prediction modes does not include a plane intra-prediction mode and the plane intra-prediction mode is determined to be the most probable mode, map the at least one neighboring coding unit to a different intra-prediction mode and determine the most probable mode based on the at least one mapped neighboring coding unit.

32. The computer program product of claim 26, wherein to select the intra-prediction mode from the available intra-prediction modes, the instructions cause the processor to determine a most probable mode based on an intra-prediction mode of at least one neighboring coding unit, and further comprising instructions that cause the processor to, when the set of available intra-prediction modes does not include a plane intra-prediction mode and the plane intra-prediction mode is determined to be the most probable mode, select another predefined intra-prediction mode instead of plane mode.

* * * * *